(12) United States Patent
Inada et al.

(10) Patent No.: US 9,317,759 B2
(45) Date of Patent: Apr. 19, 2016

(54) DRIVING ASSISTANCE DEVICE AND DRIVING ASSISTANCE METHOD

(71) Applicant: DENSO CORPORATION, Kariya, Aichi-pref. (JP)

(72) Inventors: Junya Inada, Nagoya (JP); Takeshi Enya, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/376,910

(22) PCT Filed: Mar. 8, 2013

(86) PCT No.: PCT/JP2013/001487
§ 371 (c)(1),
(2) Date: Aug. 6, 2014

(87) PCT Pub. No.: WO2013/136740
PCT Pub. Date: Sep. 19, 2013

(65) Prior Publication Data
US 2015/0010207 A1 Jan. 8, 2015

(30) Foreign Application Priority Data

Mar. 14, 2012 (JP) .................... 2012-57561
Mar. 1, 2013 (JP) .................... 2013-41039

(51) Int. Cl.
*G06K 9/00* (2006.01)
*B60K 35/00* (2006.01)
(Continued)

(52) U.S. Cl.
CPC ............ *G06K 9/00845* (2013.01); *B60K 35/00* (2013.01); *B60R 1/00* (2013.01); *G02B 27/0093* (2013.01); *G02B 27/01* (2013.01);
(Continued)

(58) Field of Classification Search
None
See application file for complete search history.

(56) References Cited

U.S. PATENT DOCUMENTS

| 2008/0077321 | A1 | 3/2008 | Widodo et al. |
| 2012/0139816 | A1* | 6/2012 | King et al. .................. 345/7 |
| 2014/0070934 | A1* | 3/2014 | Chau et al. .................. 340/438 |

FOREIGN PATENT DOCUMENTS

| JP | H06-251287 A | 9/1994 |
| JP | 2001-194161 A | 7/2001 |

(Continued)

OTHER PUBLICATIONS

International Search Report of the International Searching Authority mailed May 21, 2013 in the corresponding PCT application No. PCT/JP2013/001487 (and English translation).

(Continued)

*Primary Examiner* — Nirav G Patel
(74) *Attorney, Agent, or Firm* — Posz Law Group, PLC

(57) ABSTRACT

A current sensor includes: a magneto electric conversion element; and a magnetic field concentrating core applying a magnetic field caused by a measurement object current to the magneto electric conversion element. A planar shape of the magnetic field concentrating core perpendicular to a current flowing direction is a ring shape with a gap. The magneto electric conversion element is arranged in the gap. A part of a conductor for flowing the current is surrounded by the magnetic field concentrating core. The magnetic field concentrating core includes two first magnetic members and at least one second magnetic member, which are stacked alternately in the current flowing direction. Parts of the two first magnetic members adjacent to each other via the one second magnetic member are opposed to each other through a clearance or an insulator.

7 Claims, 18 Drawing Sheets

(51) Int. Cl.

| | | |
|---|---|---|
| *G02B 27/01* | (2006.01) | |
| *G06F 3/01* | (2006.01) | |
| *G02B 27/00* | (2006.01) | |
| *G08G 1/16* | (2006.01) | |
| *B60R 1/00* | (2006.01) | |
| *H04N 7/18* | (2006.01) | |

(52) U.S. Cl.
CPC .............. *G06F 3/012* (2013.01); *G06F 3/013* (2013.01); *G08G 1/166* (2013.01); *B60K 2350/2013* (2013.01); *B60K 2350/2052* (2013.01); *B60R 2300/308* (2013.01); *G02B 2027/0138* (2013.01); *G02B 2027/0187* (2013.01); *H04N 7/18* (2013.01)

(56) References Cited

FOREIGN PATENT DOCUMENTS

| JP | 2001-330450 A | 11/2001 |
|---|---|---|
| JP | 2004-061259 A | 2/2004 |
| JP | 2006-023953 A | 1/2006 |
| JP | 2006-090790 A | 4/2006 |
| JP | 2006-172215 A | 6/2006 |
| JP | 2007-230369 A | 9/2007 |
| JP | 2007-263931 A | 10/2007 |
| JP | 2009-043003 A | 2/2009 |
| JP | 2010-127779 A | 6/2010 |
| JP | 2010-173530 A | 8/2010 |

OTHER PUBLICATIONS

Written Opinion of the International Searching Authority mailed May 21, 2013 in the corresponding PCT application No. PCT/JP2013/001487 (and English translation).

Takahiro Ishikawa et al., "Passive Driver Gaze Tracking with Active Appearance Models", Proceedings of the 11th World Congress on Intelligent Transportation Systems, Oct. 2004.

Jonathan Harel et al., "Graph-Based Visual Saliency", NIPS 2006.

Office Action mailed May 13, 2014 in the corresponding JP application No. 2013-041039 (and English translation).

* cited by examiner

DRIVING ASSISTANCE DEVICE AND DRIVING ASSISTANCE METHOD

CROSS REFERENCE TO RELATED APPLICATIONS

The present disclosure is a U.S. national stage application of PCT/JP2013/001487 filed on Mar. 8, 2013, and is based on Japanese Patent Application No. 2012-57561 filed on Mar. 14, 2012, and No. 2013-41039 filed on Mar. 1, 2013, the contents of which are incorporated herein by reference.

TECHNICAL FIELD

The present disclosure relates to a driving assistance device and a driving assistance method displaying an image for assisting the driver of a vehicle.

BACKGROUND ART

There is a known driving assistance device which assists the driver by detecting the line of sight of the driver of a vehicle, capturing an image of a gaze object at which the driver turns his/her gaze on the basis of the direction of the detected line of sight, and enlarging and displaying the captured image on a display screen provided in front of the driver (refer to, for example, patent literature 1).

The driving assistance device described in the patent literature 1, however, has a problem such that the gaze object is enlargedly displayed uselessly also in the case where the driver gazes at the scenery in front of the vehicle although he/she does not desire enlarged display of the gaze object.

PRIOR ART LITERATURES

Patent Literature

[Patent Literature 1]
JP-A-2009-43003

SUMMARY OF INVENTION

It is an object of the present disclosure to provide a driving assistance device and a driving assistance method displaying an image for assisting the driver of a vehicle. In the driving assistance device and the driving assistance method, when the driver desires display of a gaze object at which the driver gazes, the display can be performed properly.

According to a first aspect of the present disclosure, a driving assistance device includes: a face image capturing device (S10, S810) that successively images a face of a driver of a vehicle to capture a face image; a line-of-sight direction detecting device (S30, S820) that detects a line-of-sight direction of the driver by using the face image captured by the face image capturing device; a gaze region setting device (S90, S860, S890, S920, S950, S980, S1010, S1040) that sets a gaze region, at which the driver gazes, based on the line-of-sight direction detected by the line-of-sight direction detecting device; a display device (7) having a display screen disposed in a position, at which the driver visually recognizes the display screen; a line-of-sight movement determining device (S40, S830) that determines whether a movement of moving the line of sight of the driver matches up with a display start instruction movement, which is preliminary set to instruct a start of a display by the display device, based on a detection result by the line-of-sight direction detecting device; and a display start device (S50, S110, S840, S1070, S1090, S1110, S1130, S1150, S1170, S1190, S1200) that controls the display device to start displaying display information of a content, which is preliminary set in accordance with the gaze region set by the gaze region setting device, in a case where the line-of-sight movement determining device determines that the movement of moving the line of sight of the driver matches up with the display start instruction movement match.

In the driving assistance device constructed as described above, when the driver performs a movement of moving the line of sight so that the movement matches the display start instruction movement, display information of a content which is preset according to a gaze region at which the driver gazes is displayed in the display screen disposed in the position where the screen can be visually recognized by the driver. That is, to display the display information of a content according to the gaze region, the driver has to gaze at a certain region and, in addition, after the gaze, moves the line of sight so that the movement matches the display start instruction movement which is preset. Consequently, in the case where the driver simply gazes at a certain region, the gazed region is not displayed in the display screen. When the driver desires display of display information of a content according to the gazed region, the display can be properly performed.

According to a second aspect of the present disclosure, a driving assistance method includes: successively imaging a face of a driver of a vehicle to capture a face image (S10, S810); detecting a line-of-sight direction of the driver by using the face image (S30, S820); setting a gaze region, at which the driver gazes, based on the line-of-sight direction (S90, S860, S890, S920, S950, S980, S1010, S1040); determining based on a detection result when detecting the line-of-sight direction whether a movement of moving the line of sight of the driver matches up with a display start instruction movement, which is preliminary set to instruct a start of a display (S40, S830); and displaying display information of a content, which is preliminary set in accordance with the gaze region, on a display screen disposed in a position where the driver visually recognizes the display screen in a case where the movement of moving the line of sight of the driver matches up with the display start instruction movement match (S50, S110, S840, S1070, S1090, S1110, S1130, S1150, S1170, S1190, S1200).

In the driving assistance method, when the driver performs a movement of moving the line of sight so that the movement matches the display start instruction movement, display information of a content which is preset according to a gaze region at which the driver gazes is displayed in the display screen disposed in the position where the screen can be visually recognized by the driver. That is, to display the display information of a content according to the gaze region, the driver has to gaze at a certain region and, after the gaze, moves the line of sight so that the movement matches the display start instruction movement which is preset. Consequently, in the case where the driver simply gazes at a certain region, the gazed region is not displayed in the display screen. When the driver desires display of display information of a content according to the gazed region, the display can be properly performed.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Hereinafter, a first embodiment will be described with reference to the drawings.

Figure 1:
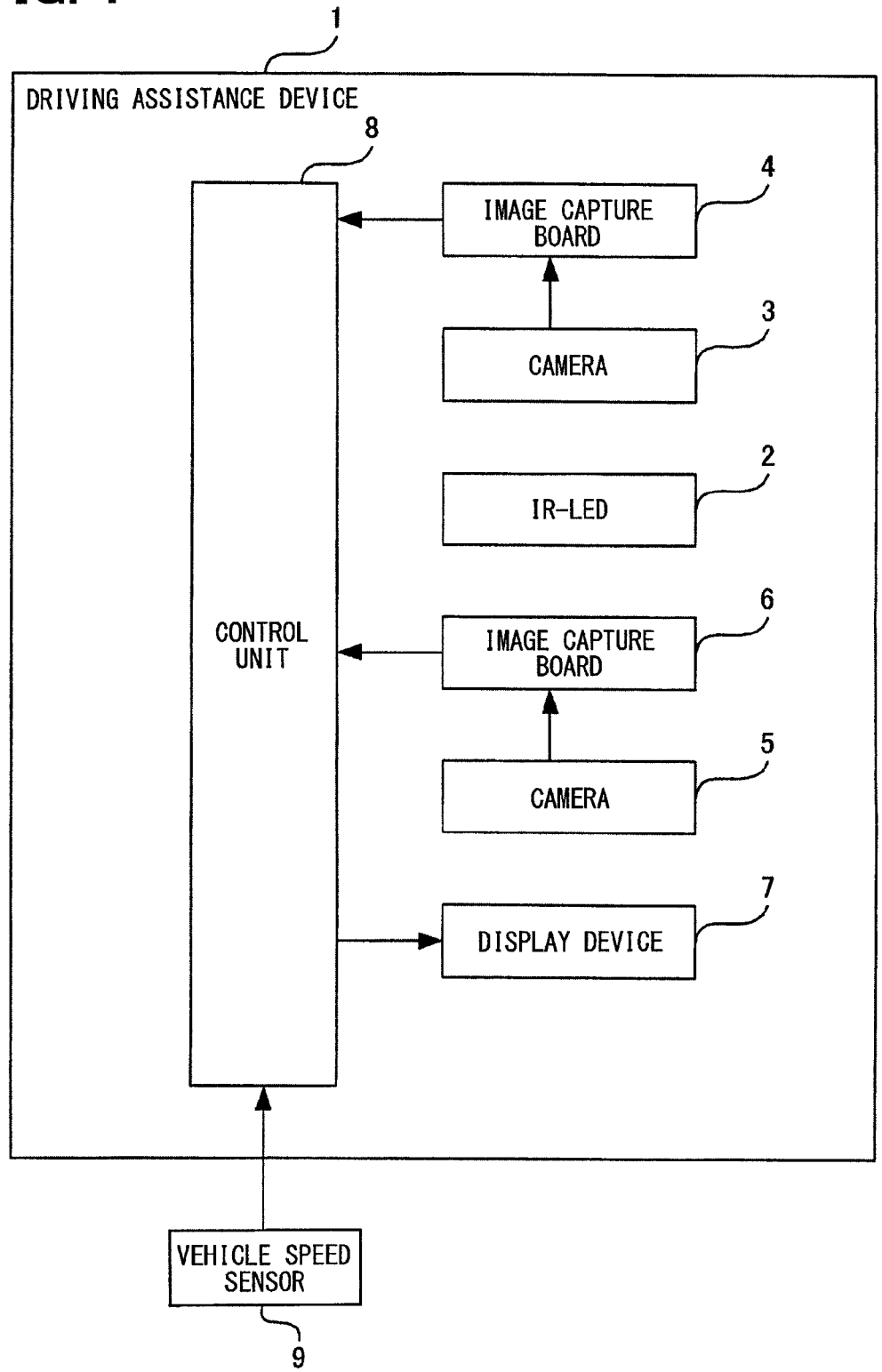
FIG. 1 is a block diagram illustrating a schematic configuration of a driving assistance device.

A driving assistance device 1 is mounted on a vehicle and has, as illustrated in FIG. 1, an IR-LED 2, cameras 3 and 5, image capture boards 4 and 6, a head-up display device (hereinbelow, called HUD device) 7, and a control unit 8.

The IR-LED 2 emits near-infrared light toward the face of a person sitting in the driver's seat of a vehicle (hereinbelow, called driver). The camera 3 is a near-infrared camera and successively images the face of the driver.

Hereinbelow, image data obtained by imaging of the camera 3 will be called face image data. The face image data obtained by the camera 3 is temporarily stored in the image capture board 4.

The camera 5 successively captures images of the scenery in front of the vehicle (hereinbelow, also called front scenery) which can be visually recognized by the driver through the windshield. Hereinafter, image data obtained by imaging of the camera 5 will be called front scenery data. The image capture board 6 temporarily stores the front scenery data obtained by the camera 5.

Figure 2:
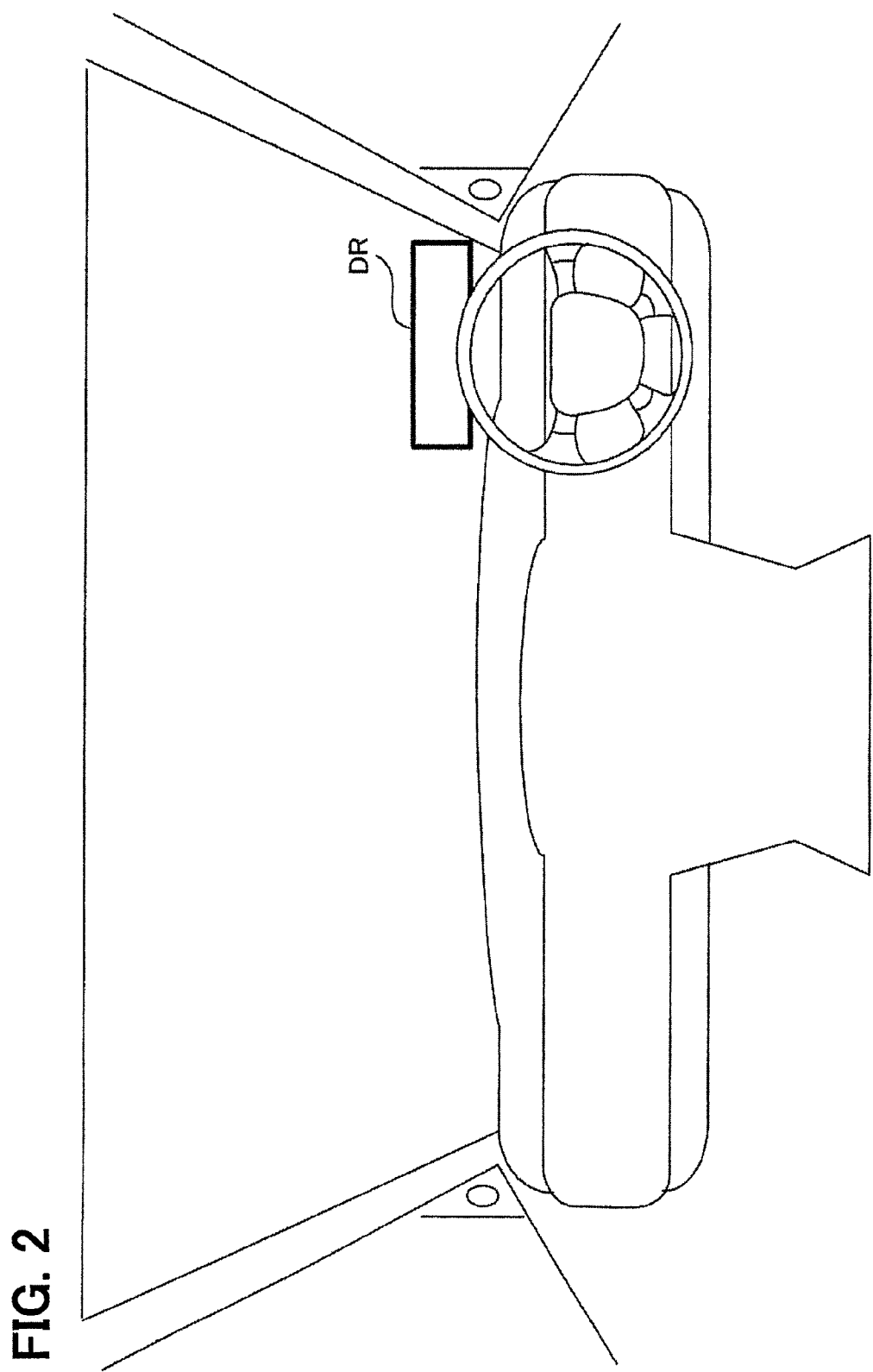
FIG. 2 is a diagram illustrating layout of a display screen region in a windshield.

The HUD device 7 emits display light for displaying an image from beneath the windshield toward the windshield. Consequently, the driver visually recognizes the projected virtual image which is superimposed on the real scenery in front of the vehicle. The HUD device 7 displays an image in a rectangular-shaped display screen region DR provided in a lower part of the windshield (refer to FIG. 2).

The control unit 8 executes various processes in accordance with inputs from the image capture boards 4 and 6 and controls the HUD device 7 by using images captured by the cameras 3 and 5. To the control unit 8, a detection signal from a vehicle speed sensor 9 which detects travel speed of the vehicle on which the driving assistance device 1 is mounted is supplied.

In the driving assistance device 1 constructed as described above, the control unit 8 executes a display process for displaying an image in the display screen region DR provided on the windshield. The display process is a process which is repeatedly executed during the operation of the driving assistance device 1.

Figure 3:
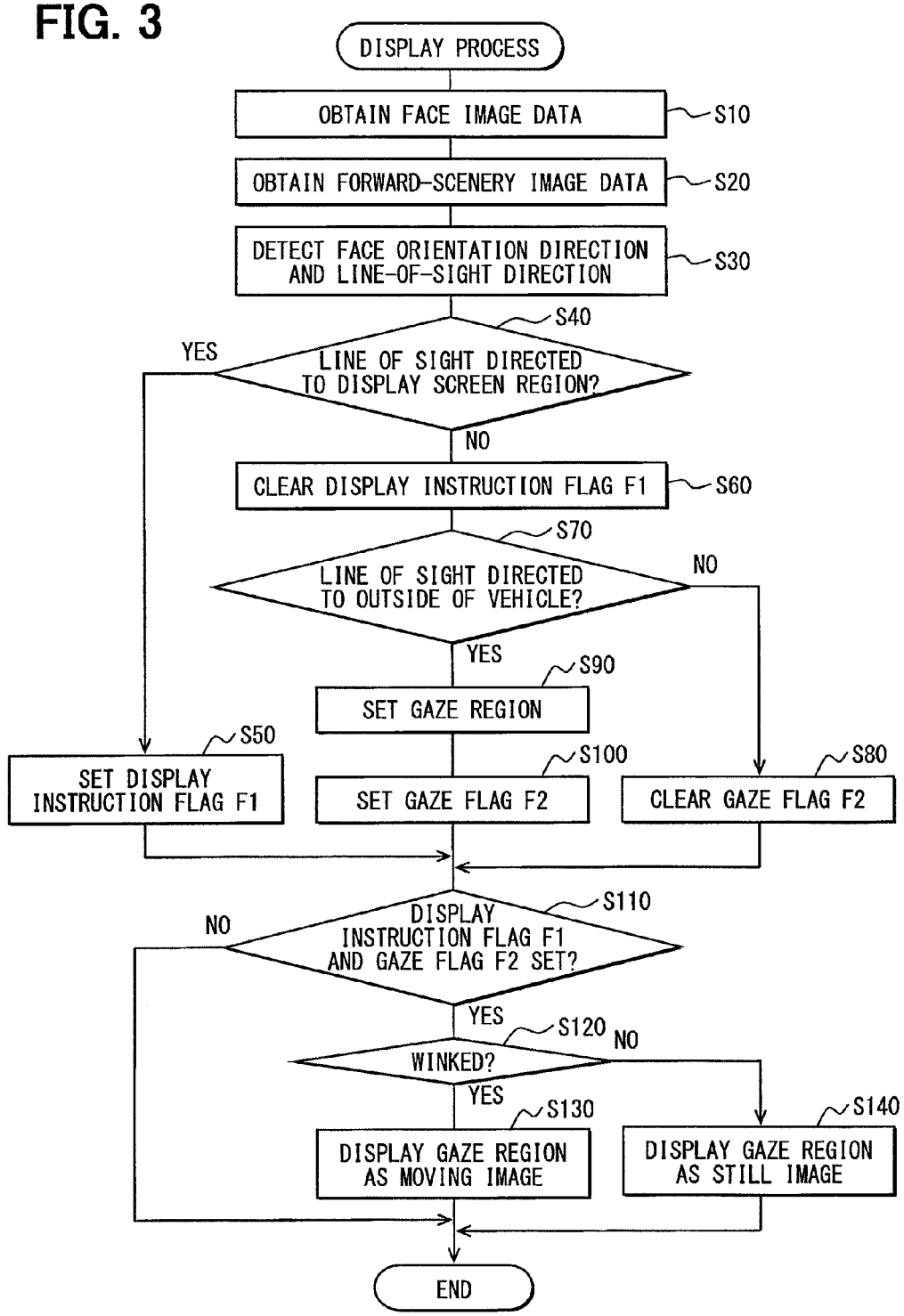
FIG. 3 is a flowchart illustrating display process of a first embodiment.

When the display process is executed, as shown in FIG. 3, first, in S10, the control unit 8 obtains face image data which is not obtained by the control unit 8 from the image capture board 4, in face image data captured by the camera 3 and stored in the image capture board 4. In S20, the control unit 8 obtains forward-scenery image data which is not captured by the control unit 8 from the image capture board 6, in forward-scenery image data captured by the camera 5 and stored in the image capture board 6.

In S30, using the face image data obtained from the image capture board 4, the face orientation direction and the line-of-sight direction of the driver are detected. Concretely, first, by performing fitting of the face image data obtained from the image capture board 4 using a face shape model, the face orientation direction of the driver is detected. The face shape mode is a method of expressing the shape of the face of a human being by performing calculation using a basic shape expressing a front face by a plurality of triangular meshes and n (n is natural number) pieces of shape vectors each expressing the face orientation direction from the basic shape (refer to, for example, "Takahiro Ishikawa, Simon Baker, Iain Matthews, and Takeo Kanade, "Passive Driver Gaze Tracking with Active Appearance Models", Proceedings of the 11th World Congress on Intelligent Transportation Systems, October, 2004"). With the above-described fitting using the face shape model, by extracting an eye of the driver from the face image data and performing an image recognizing process (for example, pattern matching) on the extracted eye, the line-of-sight direction of the driver is detected.

After that, in S40, on the basis of the detection result in S30, whether the line of sight of the driver is directed toward the display screen region DR or not. In the case where the line of sight of the driver is directed to the display screen region DR (YES in S40), a display instruction flag F1 is set in S50, and the routine moves to S110. On the other hand, in the case where the line of sight of the driver is not directed toward the display screen region DR (NO in S40), in S60, the display instruction flag F1 is cleared.

Further, in S70, whether the line of sight of the driver is directed to the outside of the vehicle or not is determined on the basis of the detection result in S30. In the case where the line of sight of the driver is not directed to the outside of the vehicle (NO in S70), a gaze flag F2 is cleared in S80, and the routine moves to S110.

Figure 4:
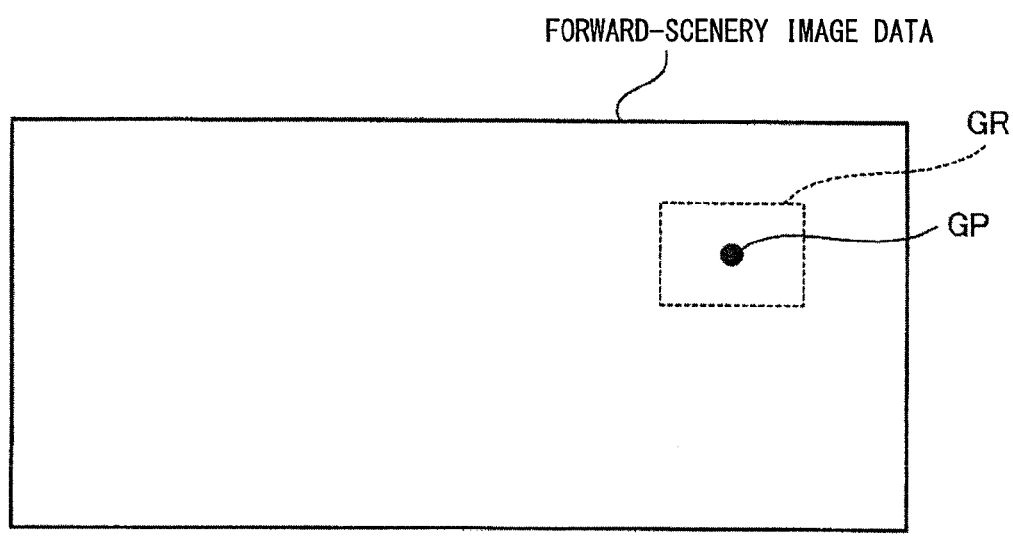
FIG. 4 is a diagram illustrating a gaze region in front scenery image data.

In the case where the line of sight of the driver is directed to the outside of the vehicle (YES in S70), in S90, a gaze region GR at which the driver gazes is set in the forward-scenery image data on the basis of the detection result in S30. Concretely, as illustrated in FIG. 4, a gaze point GP at which the driver gazes in the forward-scenery image data is determined on the basis of the direction of the line of sight of the driver, and a preset rectangular region using the gaze point GP as a center is set as the gaze region GR. After that, as illustrated in FIG. 3, the gaze flag F2 is set in S100, and the routine moves to S110.

When the routine moves to S110, whether the display instruction flag F1 and the gaze flag F2 are set or not is determined. In the case where the display instruction flag F1 and the gaze flag F2 are not set (NO in S110), the display process is finished once. On the other hand, in the case where the display instruction flag F1 and the gaze flag F2 are set (YES in S110), in S120, whether the driver winks or not is determined on the basis of the shape of the eye detected in the process of S30.

In the case where the driver winks (YES in S120), in S130, the forward-scenery image data in the gaze region GR is displayed as a moving image in the HUD device 7 until preset moving-image display time (for example, five seconds) lapses since the time point when the line of sight of the driver is directed to the display screen region DR, and the display process is finished once. On the other hand, in the case where the driver does not wink (NO in S120), in S140, the forward-scenery image data in the gaze region GR at the time point when the line of sight of the driver is directed to the display screen region DR is displayed as a still image in the HUD device 7 until preset still-image display time (for example, five seconds) lapses since the time point when the line of sight of the driver is directed to the display screen region DR, and the display process is finished once.

In the driving assistance device 1 constructed as described above, first, the face of the driver of the vehicle is successively imaged to obtain face image data (S10) and the scenery in front of the vehicle is also successively imaged to obtain forward-scenery image data (S20). After that, using the obtained face image data, the direction of the line of sight of the driver is detected (S30) and, on the basis of the detected line-of-sight direction, the gaze region GR at which the driver gazes is set (S90). The HUD device 7 displays the image data in the gaze region GR, in the obtained forward-scenery image data, into the display screen region DR disposed in a position the driver can visually recognize.

On the basis of the detection result of the line-of-sight direction, whether the driver performs the movement of directing the line of sight to the display screen region DR or not is determined (S40). In the case where it is determined that the driver performs the movement of directing the line of sight to the display screen region DR (YES in S40), display of the image data in the gaze region GR is started (S50, S110, S130, and S140).

In the driving assistance device 1 constructed as described above, when the driver performs the movement of directing the line of sight to the display screen region DR, the part of the gaze region GR in the periphery at which the driver gases in the scenery in front of the vehicle is displayed in the display screen region DR disposed in the position the driver can visually recognize. That is, to display the gaze region GR in the display screen region DR, the driver has to gaze a certain region in front of the vehicle and, after the gaze, has to perform the movement of directing the line of sight to the display screen region DR. Consequently, in the case where the driver gazes at the scenery in front of the vehicle, the gaze region GR is not displayed in the display screen region DR. Display of the gaze region GR can be properly performed when the driver desires it.

Whether the driver winks or not is determined by using the obtained face image data (S120). In the case where the driver winks (YES in S120), the image data in the gaze region GR is displayed as a moving image (S130). On the other hand, in the case where the driver does not wink (NO in S120), the image data in the gaze region GR is displayed as a still image (S140). In such a manner, during driving of the vehicle, without operating an operation member such as a button or switch, the moving-image display and the still-image display can be easily switched.

In the above-described embodiment, the process of S10 corresponds to face image capturing device and face image capturing procedure, the process of S30 corresponds to line-of-sight direction detecting device and line-of-sight direction detecting procedure, the process of S20 corresponds to scenery image capturing device and scenery image capturing procedure, the process of S90 corresponds to gaze region setting device and gaze region setting procedure, the HUD device 7 corresponds to display device, the process of S40 corresponds to line-of sight movement determining device and line-of sight movement determining process, the process of S50 and S110 corresponds to display start device and display start procedure, and the process of S120 corresponds to wink determining device.

Second Embodiment

Hereinafter, a second embodiment will be described with reference to the drawings. In the second embodiment, only parts different from the first embodiment will be described.

The driving assistance device 1 of the second embodiment is the same as that of the first embodiment except for the point that the display process is changed and the point that display adjusting process is added.

Figure 5:
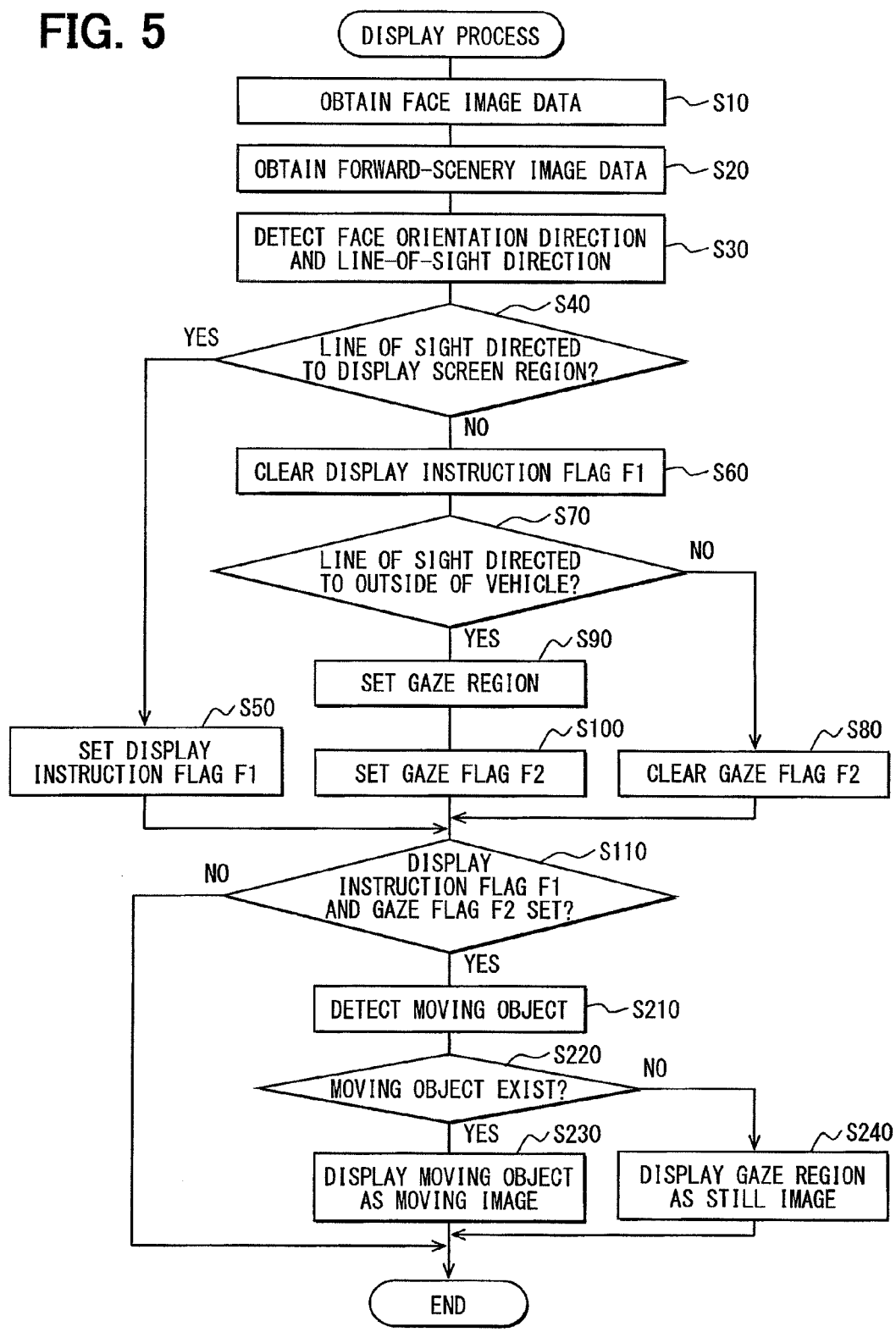
FIG. 5 is a flowchart illustrating display process of a second embodiment.

The display process of the second embodiment is similar to that of the first embodiment except that, as shown in FIG. 5, the processes in S120 to S140 are omitted and processes in S210 to S240 are added.

Specifically, in the case where the display instruction flag F1 and the gaze flag F2 are set in S110 (YES in S110), in S210, a moving object existing in front of the vehicle is detected. Concretely, by obtaining an optical flow by an image process using the forward-scenery image data, a region moving independently of the vehicle is extracted and the extracted region is detected as a moving object.

In S220, whether a moving object exists in the gaze region GR or not is determined on the basis of the detection result of S210. In the case where a moving object exists in the gaze region GR (YES in S220), in S230, by displaying the forward-scenery image data in the display region which is set in a display adjusting process to be described later as a moving image in the HUD device 7 until preset moving-image display time (for example, five seconds) lapses since the time point when the line of sight of the driver is directed to the display screen region DR, the moving object is displayed as a moving image, and the display process is finished once.

On the other hand, in the case where a moving object does not exist in the gaze region GR (NO in S220), in S240, the forward-scenery image data in the gaze region GR at the time point when the line of sight of the driver is directed to the display screen region DR is displayed as a still image in the HUD device 7 until preset still-image display time (for example, five seconds) lapses since the time point when the line of sight of the driver is directed to the display screen region DR, and the display process is finished once.

Next, the display adjusting process is a process which is repeatedly executed by the control unit 8 during the operation of the driving assistance device 1.

Figure 6:
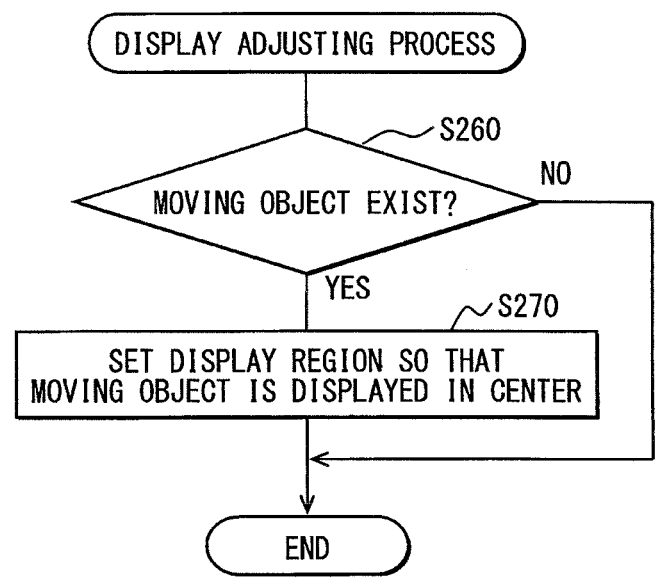
FIG. 6 is a flowchart illustrating display adjusting process of the second embodiment.

When the display adjusting process is executed, as illustrated in FIG. 6, first, in S260, the control unit 8 determines whether or not a moving object exists in the gaze region GR on the basis of the detection result in S210. In the case where a moving object does not exist in the gaze region GR (NO in S260), the display adjusting process is finished once. On the other hand, in the case where a moving object exists in the gaze region GR (YES in S260), in S270, a display region is set so that the detected moving object is positioned in the center of the display screen region DR, and the display adjusting process is finished once.

In the driving assistance device 1 constructed as described above, whether a moving object exists in the gaze region GR or not is determined by using the obtained forward-scenery image data (S220). In the case where it is determined that a moving object exists in the gaze region GR (YES in S220), the image data in the display screen region DR is displayed as a moving image (S230). Specifically, in the case where a moving object exists in the gaze region GR, without an instruction of the driver, the display is automatically performed in a mode proper to display the moving object (that is, moving-image display). Consequently, the driver can promptly and easily recognize a moving object existing in front of the vehicle by seeing the display screen region DR.

In the case where it is determined that a moving object exists in the gaze region GR (YES in S260), a display region is set so that the moving object is positioned in the center of the display screen region DR (S270). It prevents that the moving object is not displayed in the display screen region DR as it moves to the outside of the gaze region GR, and the moving object is displayed in a position proper to display the moving object (that is, the center of the display screen region DR). Consequently, the driver can promptly and easily recognize a moving object existing in front of the vehicle by seeing the display screen region DR.

In the above-described embodiment, the processes in S220 and S260 correspond to moving object determining device, and the process in S270 corresponds to first display region setting device.

Third Embodiment

Hereinafter, a third embodiment will be described with reference to the drawings. In the third embodiment, only parts different from the first embodiment will be described.

The driving assistance device 1 of the third embodiment is the same as that of the first embodiment except for the point that the display process is changed and the point that display adjusting process is added.

Figure 7:
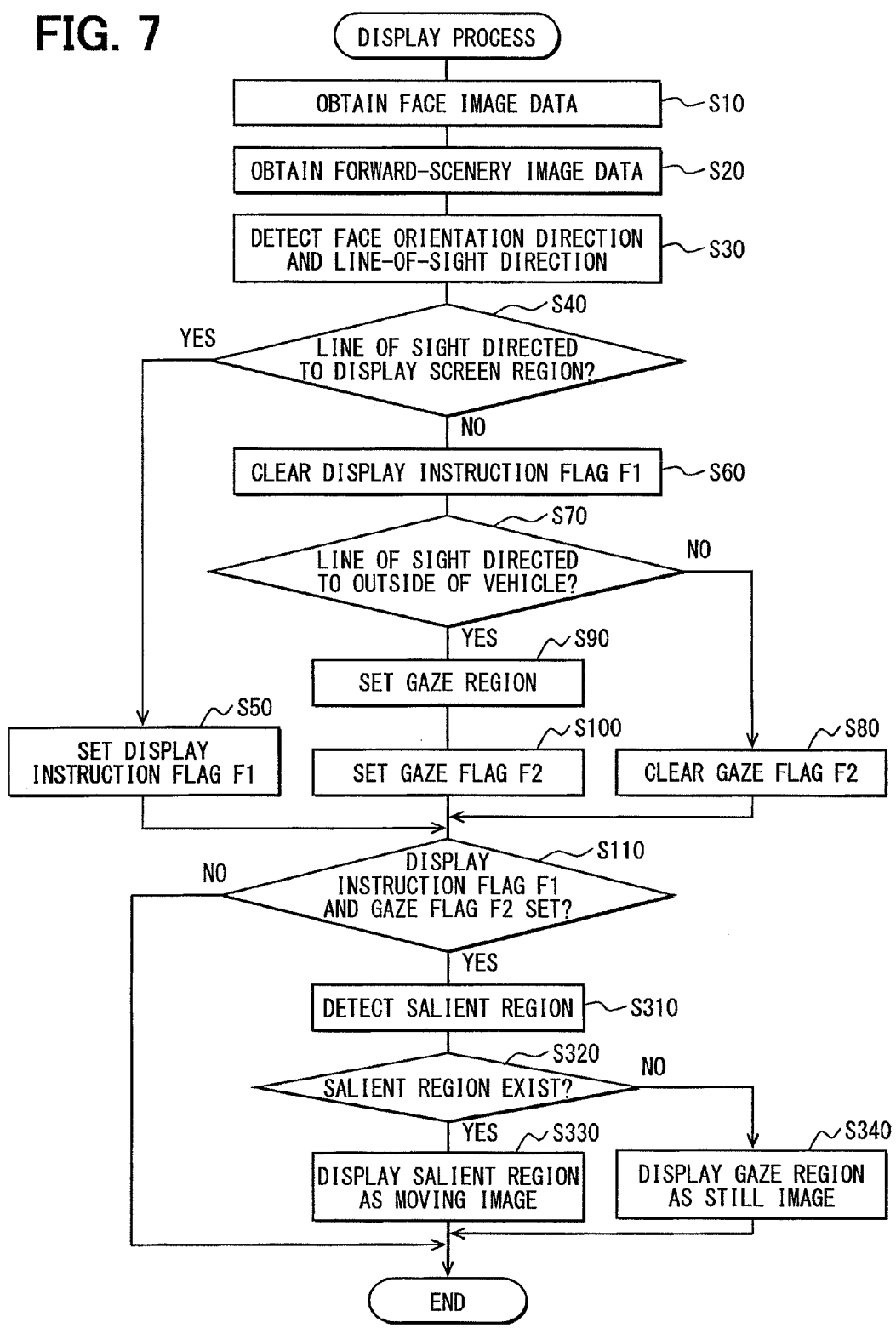
FIG. 7 is a flowchart illustrating display process of a third embodiment.

The display process of the third embodiment is similar to that of the first embodiment except that, as shown in FIG. 7, the processes in S120 to S140 are omitted and processes in S310 to S340 are added.

Specifically, in the case where the display instruction flag F1 and the gaze flag F2 are not set in S110 (NO in S110), the display process is finished once. On the other hand, in the case where the display instruction flag F1 and the gaze flag F2 are set (YES in S110), in S310, for example, using a saliency map (refer to, for example, "J. Harel, C. Koch, and P. Perona, "Graph-Based Visual Saliency", NIPS 2006"), a salient region in the gaze region GR is detected. In the embodiment, a region whose brightness is largely different from other regions in the forward-scenery image data is defined as a "salient region". For example, in the case where a road sign exists in the front scenery during travel of the vehicle, the road sign corresponds to the salient region.

In S320, whether a salient region exists in the gaze region GR or not is determined on the basis of the detection result of S310. In the case where a salient region exists in the gaze region GR (YES in S320), in S330, by displaying the forward-scenery image data in the display region which is set in a display adjusting process to be described later as a moving image in the HUD device 7 until preset moving-image display time (for example, five seconds) lapses since the time point when the line of sight of the driver is directed to the display screen region DR, the salient region is displayed as a moving image, and the display process is finished once.

On the other hand, in the case where a salient region does not exist in the gaze region GR (NO in S320), in S340, the forward-scenery image data in the gaze region GR at the time point when the line of sight of the driver is directed to the display screen region DR is displayed as a still image in the HUD device 7 until preset still-image display time (for example, five seconds) lapses since the time point when the line of sight of the driver is directed to the display screen region DR, and the display process is finished once.

Next, the display adjusting process is a process which is repeatedly executed by the control unit 8 during the operation of the driving assistance device 1.

Figure 8:
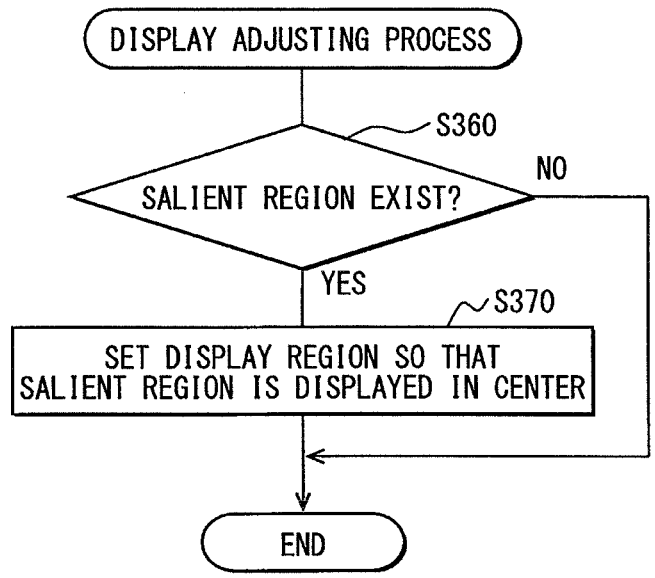
FIG. 8 is a flowchart illustrating display adjusting process of the third embodiment.

When the display adjusting process is executed, as illustrated in FIG. 8, first, in S360, the control unit 8 determines whether or not a salient region exists in the gaze region GR on the basis of the detection result in S310. In the case where a salient region does not exist in the gaze region GR (NO in S360), the display adjusting process is finished once. On the other hand, in the case where a salient region exists in the gaze region GR (YES in S360), in S370, a display region is set so that the detected salient region is positioned in the center of the display screen region DR, and the display adjusting process is finished once.

In the driving assistance device 1 constructed as described above, whether a salient region exists in the gaze region GR or not is determined by using the obtained forward-scenery image data (S360). In the case where it is determined that a salient region exists in the gaze region GR (YES in S360), the display region is set so that the salient region is positioned in the center of the display screen region DR (S370).

Consequently, for example, also in the case where the driver visually recognizes a salient region (road sign, signboard, pedestrian, or the like) in the front scenery in the peripheral visual field during travel of the vehicle, the salient region is displayed in the center of the display screen region DR. Consequently, even in the case that the existence itself of the salient region can be recognized in visual recognition in the peripheral visual field but the details and the situation of the region cannot be correctly recognized, the driver can promptly and easily recognize a salient region existing in front of the vehicle by seeing the display screen region DR.

Even in the case that, for example, although the driver visually recognizes a salient region in the front scenery in the central visual field during travel of the vehicle, due to low detection precision in the line-of-sight direction, the actual gaze point of the driver and the gaze point GP determined by the driving assistance device 1 are different from each other, the salient region is displayed in the center of the display screen region DR. That is, even in the case where a salient region exists in a position deviated from the gaze position GP, the salient region is displayed in a position proper to display the salient region (that is, the center of the display screen region DR). Consequently, the driver can promptly and easily recognize a salient region existing in front of the vehicle by seeing the display screen region DR.

In the above-described embodiment, the process in S360 corresponds to salient region determining device, and the process in S370 corresponds to second display region setting device.

Fourth Embodiment

Hereinafter, a fourth embodiment will be described with reference to the drawings. In the fourth embodiment, only parts different from the first embodiment will be described.

The driving assistance device 1 of the fourth embodiment is the same as that of the first embodiment except for the point that display adjusting process is added.

The display adjusting process is a process which is repeatedly executed by the control unit 8 during the operation of the driving assistance device 1.

Figure 9:
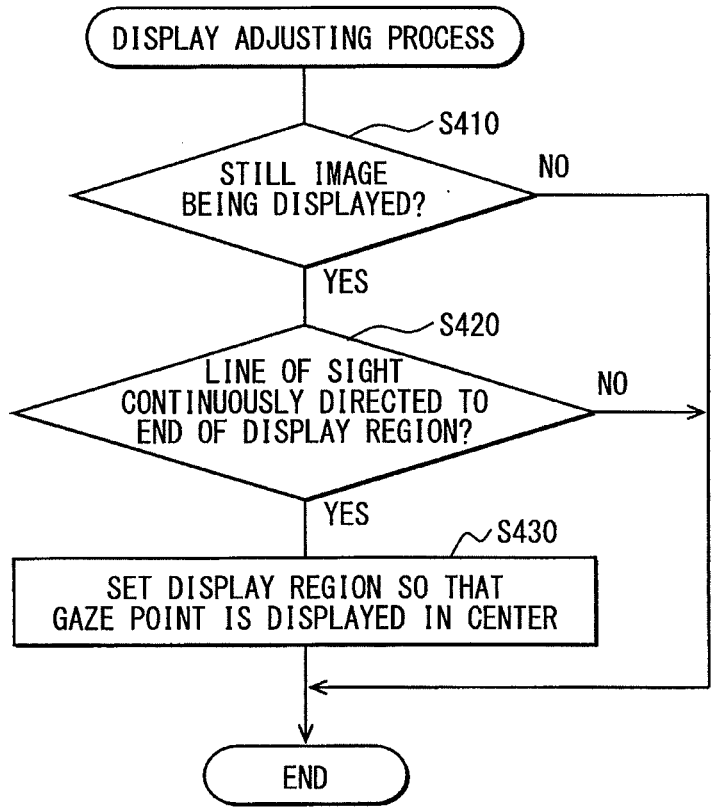
FIG. 9 is a flowchart illustrating display adjusting process of a fourth embodiment.

When the display adjusting process is executed, as illustrated in FIG. 9, first, in S410, the control unit 8 determines whether or not a still image is being displayed in the display screen region DR. In the case where a still image is not being displayed (NO in S410), the display adjusting process is finished once.

On the other hand, in the case where a still image is being displayed (YES in S410), in S420, whether the line of sight of the driver is directed to an end of the display screen region DR successively for preset display adjustment determination time (in the embodiment, for example, two seconds) is determined on the basis of the detection result in S30. In the case where the line of sight is not directed to an end of the display screen region DR successively for the display adjustment determination time (NO in S420), the display adjusting process is finished once.

Figure 10:
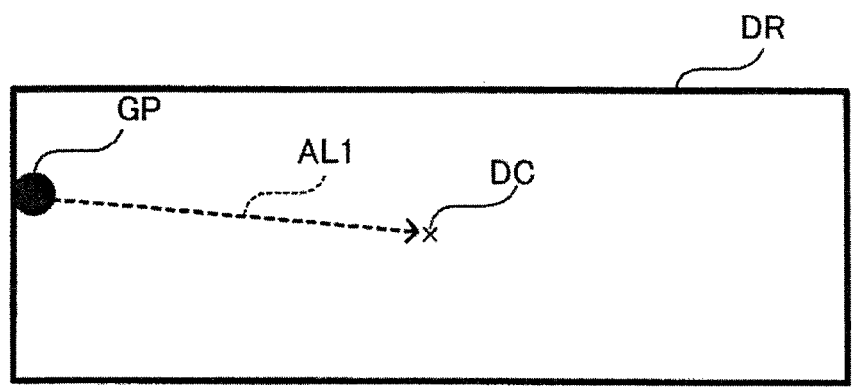
FIG. 10 is a diagram illustrating scrolling of the display image in the display screen region.

On the other hand, in the case where the line of sight is directed to an end of the display screen region DR successively for the display adjustment determination time (YES in S420), in S430, as illustrated in FIG. 10, a display region in the forward-scenery image data is set so that the gaze point GP of the driver at an end of the display screen region DR is positioned in the center of the display screen region DR (refer to the arrow AL1), and the display adjusting process is finished once. By the operation, the still image displayed in the display screen region DR is scrolled so that the point gazed by the driver at an end of the display screen region DR becomes the center DC of the display screen region DR.

In the driving assistance device 1 constructed as described above, whether the driver gazes at an end of the display screen region DR or not is determined on the basis of the detected line-of-sight direction (S420). In the case where it is determined that the driver gazes at an end of the display screen region DR (YES in S420), a display region is set so that the gaze point GP at which the driver gazes at an end of the display screen region DR is positioned in the center of the display screen region DR (S430).

Consequently, by gazing at an end of the display screen region DR, a region (display region) displayed in the display screen region DR can be easily changed in the forward-scenery image data without operating an operation member such as a button or a switch.

In the above-described embodiment, the process in S420 corresponds to gaze determining device, and the process in S430 corresponds to third display region setting device.

Fifth Embodiment

Hereinafter, a fifth embodiment will be described with reference to the drawings. In the fifth embodiment, only parts different from the first embodiment will be described.

Figure 11:
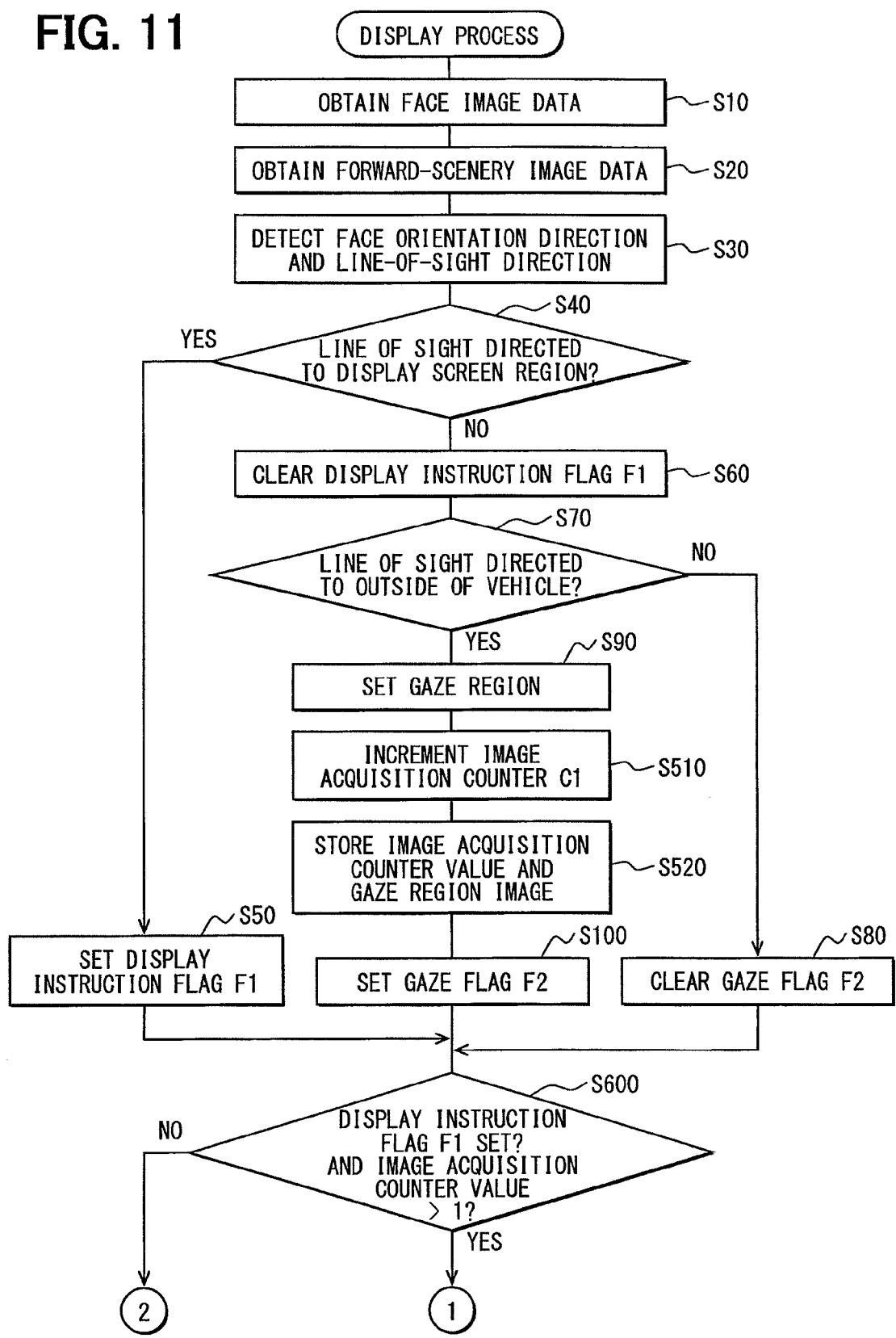
FIG. 11 is a flowchart illustrating the first half of display process of a fifth embodiment.
Figure 12:
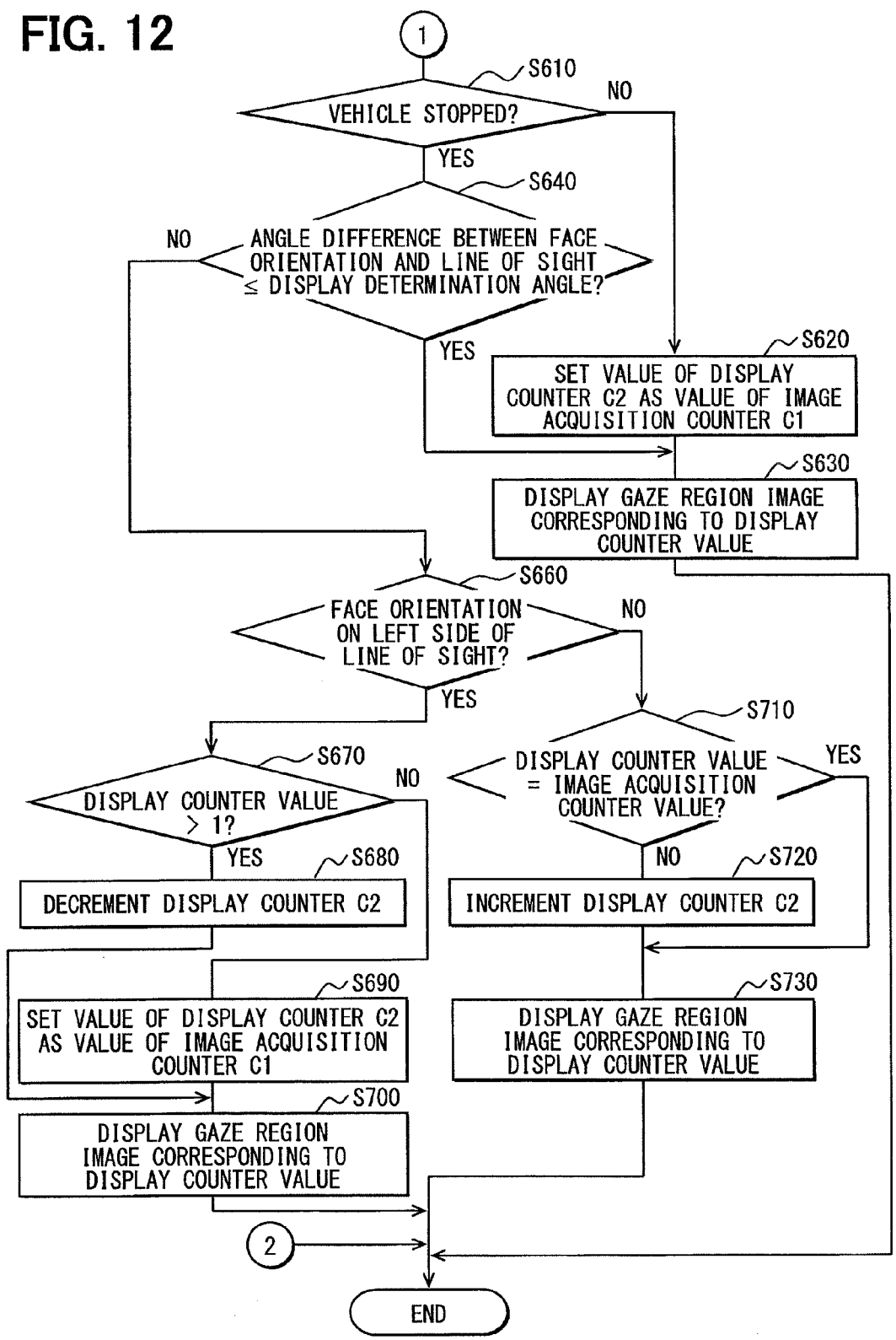
FIG. 12 is a flowchart illustrating the latter half of the display process of the fifth embodiment.

The driving assistance device 1 of the fifth embodiment is the same as that of the first embodiment except for the point that the display process is changed. The display process of the fifth embodiment is similar to that of the first embodiment except for points that, as illustrated in FIGS. 11 and 12, the processes in S110 to S140 are omitted and processes in S510 and S520, and S600 to S720 are added.

Specifically, when the process of S90 is finished, in S510, an image acquisition counter C1 is incremented (addition by one). The value of the image acquisition counter C1 is initialized at the start of operation of the driving assistance device 1 and set to zero. In S520, an image in the gaze region GR set in S90 is extracted from forward-scenery image data captured at the time point when the line of sight of the driver is directed to the outside of the vehicle on the basis of a determination result in S70, and the data of the extracted image (hereinbelow, also called a gaze region image) is stored so as to be associated with the value of the image acquisition counter C1 (hereinbelow, also called an image acquisition counter value), and the routine moves to S100.

When the process in S50, S80, or S100 is finished, the routine moves to S600 where the display instruction flag F1 is set and whether the image acquisition counter value is larger than one or not is determined. In the case where the image acquisition counter value is one or less (NO in S600), the display process is finished once. On the other hand, in the case where the display instruction flag F1 is set and the image acquisition counter value is larger than one (YES in S600), in S610, whether a vehicle on which the driving assistance device 1 is mounted (hereinbelow, called the vehicle) is stopped or not is determined on the basis of the detection result of the vehicle speed sensor 9. In the case where the vehicle is not stopped (NO in S610), in S620, the value of the display counter C2 (hereinbelow, also called display counter value) is set as the image acquisition counter value. In S630, data of the gaze region image associated with the image acquisition counter value which matches the display counter value, in the gaze region image stored by the process in S520 is displayed as a still image in the HUD device 7, and the display process is finished once. By the processes in S620 and S630, the latest one in the stored gaze region images is displayed in the display screen region DR.

On the other hand, in the case where the vehicle stops (YES in S610), in S640, whether the angle difference between the face orientation direction of the driver and the line-of-sight direction is equal to or less than a preset display determination angle (in the embodiment, for example, 10°) is determined on the basis of the detection result in S30. In the case where the angle difference between the face orientation direction and the line-of-sight direction is equal to or less than the display determination angle (YES in S640), the routine moves to S630. By the operation, the gaze region image associated with the image acquisition counter value which matches the display counter value is displayed in the display screen region DR.

In the case where the angle difference between the face orientation direction and the line-of-sight direction is larger than the display determination angle in S640 (NO in S640), in S660, whether the face orientation direction is directed to the left side more than the line-of-sight direction or not is determined. In the case where the face orientation direction is directed to the left side more than the line-of-sight direction (YES in S660), in S670, whether the display counter value is larger than one or not is determined.

In the case where the display counter value is larger than one (YES in S670), the display counter C2 is decremented (subtraction by one) in S680, and the routine advances to S700. On the other hand, in the case where the display counter value is one (NO in S670), in S690, the value (display counter value) of the display counter C2 is set to the image acquisition counter value, and the routine moves to S700.

When the routine moves to S700, data of the gaze region image associated with the image acquisition counter value which matches the display counter value is displayed as a still image in the HUD device 7, and the display process is finished once.

In the case where the face orientation direction is directed to the right side more than the line-of-sight direction in S660 (NO in S660), in S710, whether the display counter value is equal to the image acquisition counter value or not is determined. In the case where the display counter value is equal to the image acquisition counter value (YES in S710), the routine moves to S730. On the other hand, in the case where the display counter value is not equal to the image acquisition counter value (NO in S710), the display counter C2 is incremented (addition by one) in S720, and the routine moves to S730. When the routine moves to S730, the data of the gaze region image associated with the image acquisition counter value which matches the display counter value is displayed as a still image in the HUD device 7, and the display process is finished once.

Hereinafter, operation in the case where a stored gaze region image is displayed in the display screen region DR in the driving assistance device 1 constructed as described above will be described.

First, in the case where the vehicle is traveling when the driver directs his/her line of sight to the display screen region DR (YES in S600 and NO in S610), the latest one of the stored gaze region images is displayed in the display screen region DR (S620 and S630). After that, when the driver directs his/her line of sight to the display screen region DR while the vehicle stops (YES in S600 and YES in S610), first, the latest one of the stored gaze region image is displayed in the display screen region DR (S630). When the driver turns his/her face to the left while directing his/her line of sight to the display screen region DR (NO in S640 and YES in S660), the gaze region image obtained immediately before the gaze region image which is being displayed at present is displayed in the display screen region DR (S680 and S700). When the driver turns his/her face to the right while directing his/her line of sight to the display screen region DR (NO in S640 and NO in S660), the gaze region image obtained immediately after the gaze region image which is being displayed at present is displayed in the display screen region DR (S720 and S730).

When the driver turns his/her face to the left while directing the line of sight to the display screen region DR in a state where the oldest gaze region image is being displayed (when the display counter value=1) (NO in S640 and YES in S660), the latest one of the stored gaze region images is displayed in the display screen region DR (S690 and S700). When the driver turns his/her face to the right while directing the line of sight to the display screen region DR in a state where the latest gaze region image is being displayed (NO in S640 and NO in S660), the latest gaze region image remains being displayed (YES in S710).

In the driving assistance device 1 constructed as described above, the image in the gaze region GR in the acquired forward-scenery image data is extracted, and the extracted gaze region image data is stored in chronological order (S510 and S520), and the stored gaze region image data is displayed in the display screen region DR (S630, S700, and S730). The face orientation direction of the driver is detected by the obtained face image data (S30) and, on the basis of the detected face orientation direction, the gaze region image data to be displayed is instructed (S660 to S690 and S710 and S720).

In such a manner, the gazed front scenery can be displayed in the display screen region DR and recognized at the gaze time point and, in addition, a plurality of gaze region images can be captured, stored and, later, recognized in a lump. For example, even in the case where the gaze region image cannot be fully recognized at the gaze time because the driver is driving, by displaying the gaze region image again after the vehicle is stopped, the gaze region image can be fully recognized.

According to the face orientation direction, without operating an operation member such as a button or a switch, the gaze region image displayed in the display screen region DR can be easily changed.

In the above-described embodiment, the processes in S510 and S520 correspond to image storing device, the processes in S630, S700, and S730 correspond to stored image displaying device, the process in S30 corresponds to face orientation direction detecting device, and the processes in S660 to S690 and S710 and S720 correspond to display instructing device.

Sixth Embodiment

Hereinafter, a sixth embodiment will be described with reference to the drawings.

Figure 13:
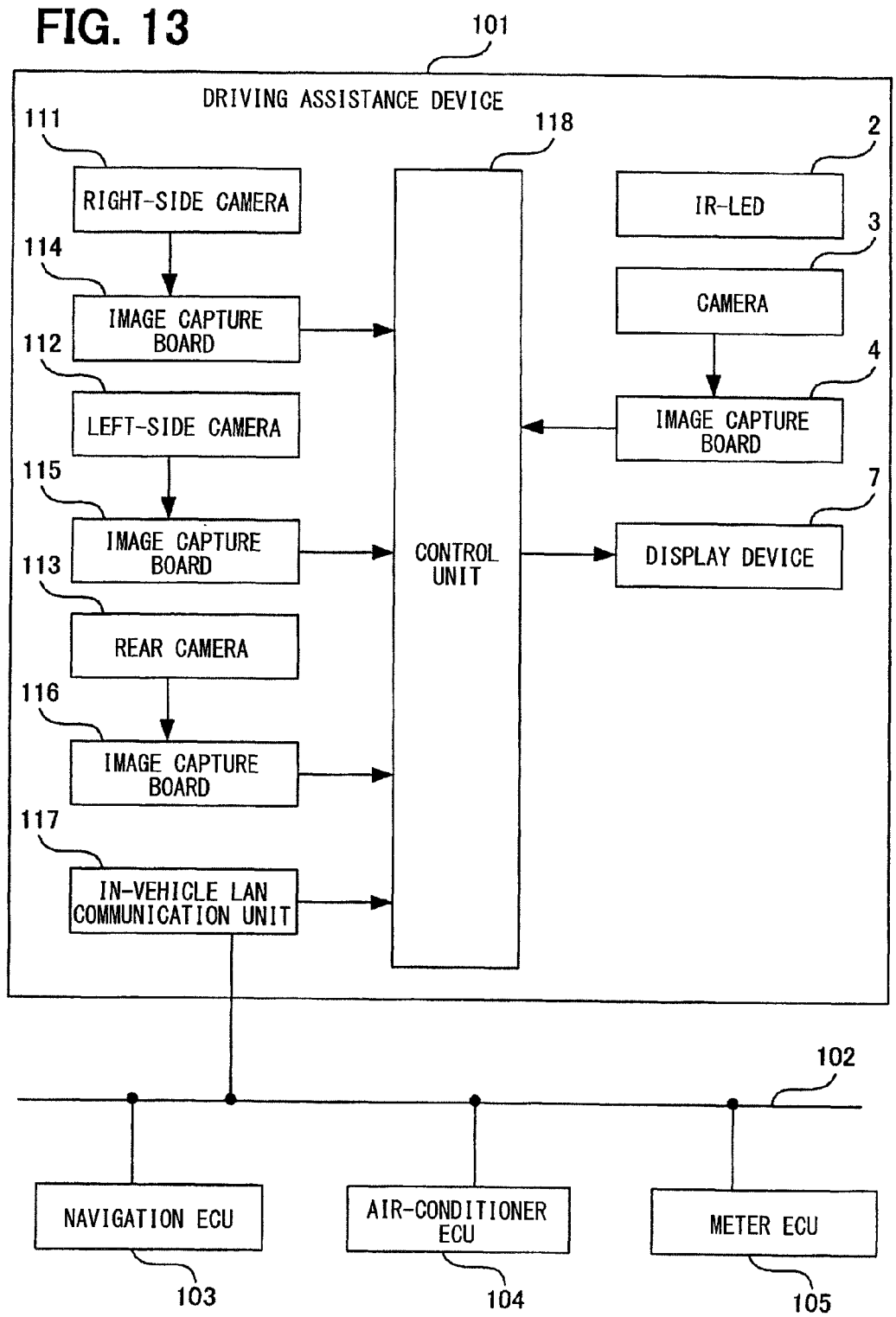
FIG. 13 is a block diagram illustrating a schematic configuration of a driving assistance device.

As illustrated in FIG. 13, a driving assistance device 101 is mounted on a vehicle, and are connected to a navigation ECU 103, an air-conditioner ECU 104, and a meter ECU 105 via an in-vehicle LAN 102.

The navigation ECU 103 is configured so as to detect the present position of the vehicle on the basis of a GPS signal received via a GPS (Global Positioning System) antenna (not illustrated). The navigation ECU 103 is constructed to execute a control for displaying the present position of the vehicle in a display screen 131 (refer to FIG. 14) of a navigation system disposed in an instrument panel 130 (refer to FIG. 14), a control for guiding a path from the present position to a destination, and the like.

The navigation ECU 103 is configured to execute control on an in-vehicle audio system (not illustrated) on the basis of a signal from an audio operation switch group 132 (refer to FIG. 14) which is mounted in the instrument panel 130 and operated by the driver. The audio operation switch group 132 includes a change-over switch which is operated in the case of switching a device to be operated from CD, TV, and radio devices, a change-over switch which is operated in the case of switching, after the switching of the device to be operated, selection of a channel or a music piece, a volume setting switch which is operated in the case of adjusting the volume.

The air-conditioner ECU 104 is configured to control air condition in the vehicle by operating a car air-conditioner (not illustrated) on the basis of a signal from an air-conditioner operation switch group 133 (refer to FIG. 14) which is mounted in the instruction panel 130 and operated by the driver and a detection signal from a vehicle interior/exterior temperature sensor (not illustrated) for detecting temperatures inside and outside of the vehicle. An air-conditioner operation switch group 133 includes an on/off switch operated to switch operation/non-operation of the air conditioner, a temperature setting switch operated to adjust setting temperature, an air volume setting switch operated to adjust air volume, and an air outlet position setting switch operated to adjust an air outlet position.

The meter ECU 105 controls a meter unit 140 (refer to FIG. 14) which is mounted in front of the driver's seat and displays various states of the vehicle. The meter unit 140 displays the vehicle speed, the shift range of an automatic transmission (not illustrated), engine rotational speed, gasoline residual amount, a state of an automatic cruise control (ACC), a state of a lane keep assist (LKA), and the like.

The driving assistance device 101 has the IR-LED 2, the camera 3, the image capture board 4, the HUD device 7, a right-side camera 111, a left-side camera 112, a rear camera 113, image capture boards 114, 115, and 116, an in-vehicle LAN communication unit 117, and a control unit 118.

Since the IR-LED 2, the camera 3, the image capture board 4, and the HUD device 7 are the same as those of the first embodiment, the description will not be repeated.

The right-side camera 111 is mounted at the right end part of the vehicle (a side mirror 151 (refer to FIG. 14) on the right side of the vehicle in the embodiment) and obtains image data by successively imaging the state on the right side of the vehicle.

The left-side camera 112 is mounted at the left end part of the vehicle (a side mirror 152 (refer to FIG. 14) on the left side of the vehicle in the embodiment) and obtains image data by successively imaging the state on the left side of the vehicle.

The rear camera 113 is mounted in a rear end part of the vehicle (in the embodiment, a rear bumper) and obtains image data by successively imaging the state on the rear side of the vehicle.

The image capture boards 114, 115, and 116 temporarily store the image data obtained by the cameras 111, 112, and 113, respectively.

The in-vehicle LAN communication unit 117 performs communication with various devices (such as the navigation ECU 103) connected to the in-vehicle LAN 102 via the in-vehicle LAN 102.

The control unit 118 is constructed mainly by a known-microcomputer including a CPU, a ROM, a RAM, an I/O, and a bus line connecting those components, and executes various processes on the basis of a program stored in the ROM.

In the driving assistance device 101 constructed as described above, the control unit 118 executes a display process for displaying an image in the display screen region DR provided on the windshield. The display process is a process which is repeatedly executed during the operation of the driving assistance device 101.

Figure 15A:
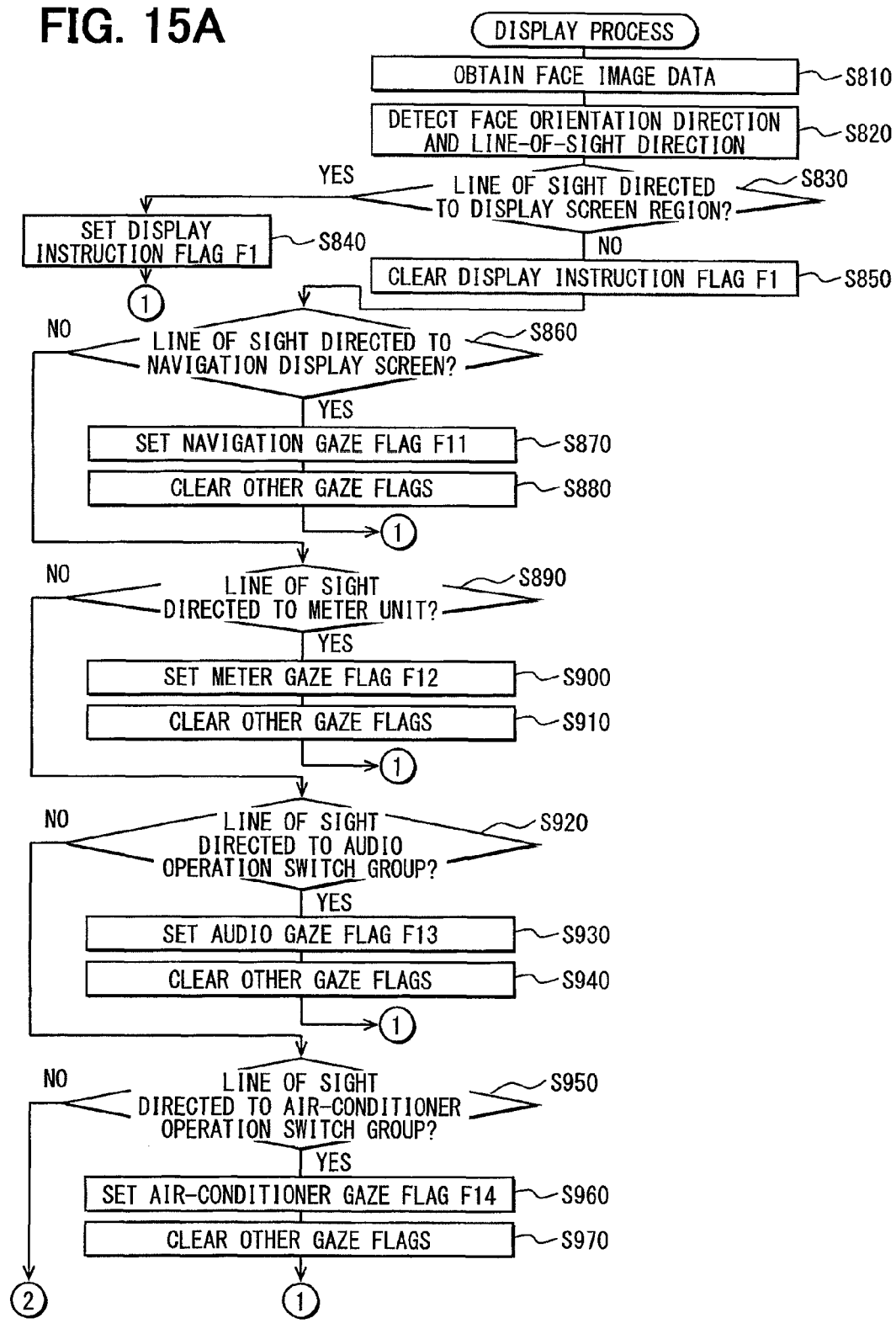
FIG. 15A is a flowchart illustrating the first half of display process of a sixth embodiment.
Figure 15B:
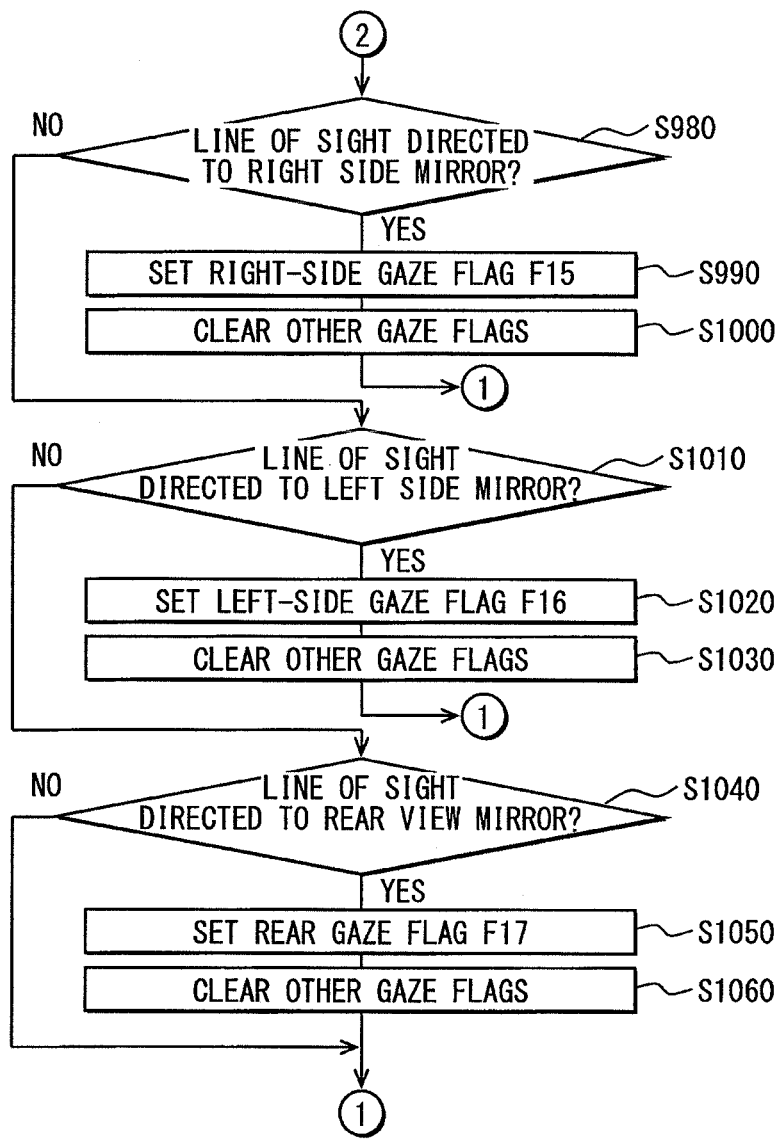
FIG. 15B is a flowchart illustrating the first half of the display process of the sixth embodiment.
Figure 16:
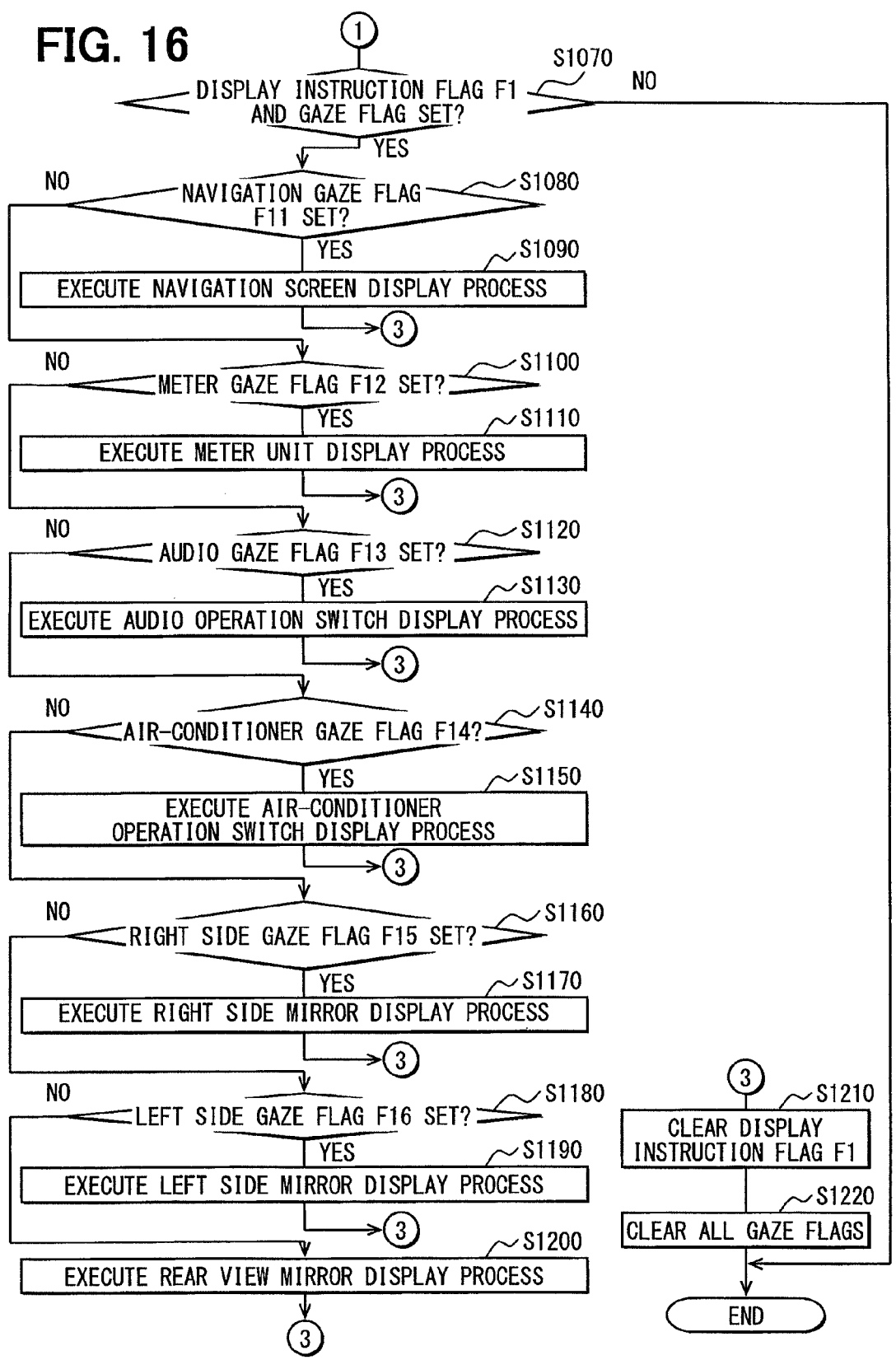
FIG. 16 is a flowchart illustrating the latter half of the display process of the sixth embodiment.

When the display process is executed, as illustrated in FIGS. 15A, 15B, and 16, first, in S810, like in S10, the control unit 118 obtains face image data which is not obtained by the control unit 8 from the image capture board 4, in the face image data captured by the camera 3 and stored in the image capture board 4.

In S820, like in S30, using the face image data obtained from the image capture board 4, the face orientation direction and the line-of-sight direction of the driver are detected.

After that, in S830, on the basis of the detection result in S820, whether the line of sight of the driver is directed to the display screen region DR or not is determined. In the case where the line of sight of the driver is directed to the display screen region DR (YES in S830), the display instruction flag F1 is set in S840, and the routine moves to S1070. On the other hand, in the case where the line of sight of the driver is not directed to the display screen region DR (NO in S830), in S850, the display instruction flag F1 is cleared.

Further, in S860, whether the line of sight of the driver is directed to the display screen 131 of the navigation device or not is determined on the basis of the detection result in S820. In the case where the line of sight of the driver is directed to the display screen 131 (YES in S860), a navigation gaze flag F11 is set in S870. Further, the other gaze flags F12, F13, F14, F15, F16, and F17 are cleared in S880, and the routine moves to S1070. The other gaze flags are, as will be described later, the meter gaze flag F12, the audio gaze flag F13, the air-conditioner gaze flag F14, the right-side gaze flag F15, the left-side gaze flag F16, and the rear-side gaze flag F17.

On the other hand, in the case where the line of sight is not directed to the display screen 131 of the navigation device (NO in S860), in S890, whether the line of sight of the driver is directed to the meter unit 140 or not is determined on the basis of the detection result in S820. In the case where the line of sight is directed to the meter unit 140 (YES in S890), the meter gaze flag F12 is set in S900, the gaze flags other than the meter gaze flag F12 are cleared in S910, and the routine moves to S1070.

On the other hand, in the case where the line of sight is not directed to the meter unit 140 (NO in S890), in S920, whether the line of sight of the driver is directed to the audio operation switch group 132 or not is determined on the basis of the detection result in S820. In the case where the line of sight is directed to the audio operation switch group 132 (YES in S920), the audio gaze flag F13 is set in S930, the gaze flags other than the audio gaze flag F13 are cleared in S940, and the routine moves to S1070.

On the other hand, in the case where the line of sight is not directed to the audio operation switch group 132 (NO in S920), in S950, whether the line of sight of the driver is directed to the air-conditioner operation switch group 133 or not is determined on the basis of the detection result in S820. In the case where the line of sight is directed to the air conditioner operation switch group 133 (YES in S950), the air-conditioner gaze flag F14 is set in S960, the gaze flags other than the air-conditioner gaze flag F14 are cleared in S970, and the routine moves to S1070.

On the other hand, in the case where the line of sight is not directed to the air-conditioner operation switch group 133 (NO in S950), in S980, whether the line of sight of the driver is directed to the side mirror 151 on the right side of the vehicle or not is determined on the basis of the detection result in S820. In the case where the line of sight is directed to the side mirror 151 on the right side (YES in S980), the right-side gaze flag F15 is set in S990, the gaze flags other than the right-side gaze flag F15 are cleared in S1000, and the routine moves to S1070.

On the other hand, in the case where the line of sight is not directed to the side mirror 151 on the right side (NO in S980), in S1010, whether the line of sight of the driver is directed to the side mirror 152 on the left side of the vehicle or not is determined on the basis of the detection result in S820. In the case where the line of sight is directed to the side mirror 152 on the left side (YES in S1010), the left-side gaze flag F16 is set in S1020, the gaze flags other than the left-side gaze flag F16 are cleared in S1030, and the routine moves to S1070.

On the other hand, in the case where the line of sight is not directed to the side mirror 152 on the left side (NO in S1010), in S1040, whether the line of sight of the driver is directed to a rear-view mirror 153 (refer to FIG. 14) or not is determined on the basis of the detection result in S820. In the case where the line of sight is directed to the rear-view mirror 153 (YES in S1040), the rear gaze flag F17 is set in S1050, the gaze flags other than the rear gaze flag F17 are cleared in S1060, and the routine moves to S1070.

When the routine moves to S1070, whether the display instruction flag F1 is set and any one of the gaze flags F11, F12, F13, F14, F15, F16, and F17 is set or not is determined. In the case where the display instruction flag F1 and at least any of the gaze flags are not set (NO in S1070), the display process is finished once. On the other hand, in the case where the display instruction flag F1 is set and any one of the gaze flags is set (YES in S1070), in S1080, whether the navigation gaze flag F11 is set or not is determined.

In the case where the navigation gaze flag F11 is set (YES in S1080), a navigation screen display process is executed in S1090. After completion of the navigation screen display process, the routine advances to S1210. In the navigation screen display process, concretely, image data expressing an image displayed in the display screen 131 of the navigation device is obtained from the navigation ECU 103 via the in-vehicle LAN 102, and the HUD device 7 is made display the obtained image data until preset image display time (for example, three seconds) elapses since the time point when the line of sight of the driver is directed to the display screen region DR.

On the other hand, in the case where the navigation gaze flag F11 is not set (NO in S1080), in S1100, whether the meter gaze flag F12 is set or not is determined. In the case where the meter gaze flag F12 is set (YES in S1100), a meter unit display process is executed in S1110. After completion of the meter unit display process, the routine advances to S1210. In the meter unit display process, concretely, first, on the basis of the detection result in S820, a region to which the line of sight of the driver is directed in the meter unit 140 is specified. In the meter unit display process, information displayed in the specified region is obtained from the meter ECU 105 via the in-vehicle LAN 102, and the HUD device 7 is made display the obtained information until preset image display time (for example, three seconds) lapses since the time point when the line of sight of the driver is directed to the display screen region DR.

For example, in the case where the line of sight of the driver is directed to the region in which the vehicle speed is displayed in the meter unit 140, in the meter unit display process, vehicle speed information indicative of vehicle speed is obtained from the meter ECU 105, and the HUD device 7 is made display an image indicating the obtained vehicle speed information.

On the other hand, in the case where the meter gaze flag F12 is not set (NO in S1100), in S1120, whether the audio gaze flag F13 is set or not is determined. In the case where the audio gaze flag F13 is set (YES in S1120), an audio operation switch display process is executed in S1130. After completion of the audio operation switch display process, the routine advances to S1210. In the audio operation switch display process, concretely, first, on the basis of the detection result in S820, a switch to which the line of sight of the driver is directed in the audio operation switch group 132 is specified. In the audio operation switch display process, setting state information indicative of the present state which is set by the operation of the specified switch is obtained from the navigation ECU 103 via the in-vehicle LAN 102, and the HUD device 7 is made display the obtained information until preset image display time (for example, three seconds) lapses since the time point when the line of sight of the driver is directed to the display screen region DR.

For example, in the case where the line of sight of the driver is directed to the volume setting switch, in audio operation switch display process, volume information indicative of the volume at present is obtained from the meter ECU 105, and the HUD device 7 is made display an image indicating the obtained volume information.

Figure 14:
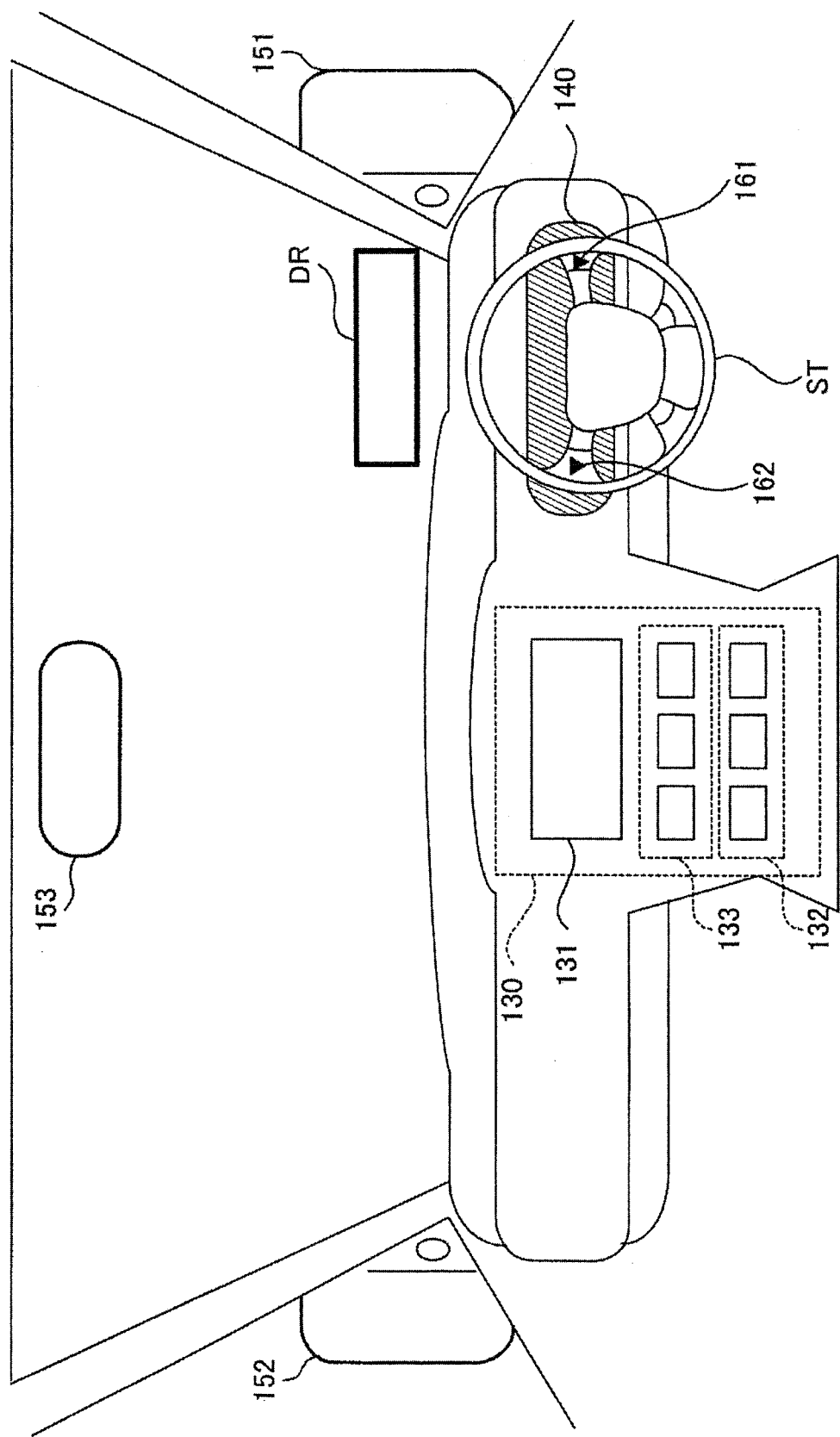
FIG. 14 is a diagram illustrating a situation when the front of a vehicle is glanced from the inside of a vehicle.

In the case where setting state information of the switch specified in the audio operation switch display process is displayed by the HUD device 7, the navigation ECU 103 changes the setting state of the specified switch on the basis of the operation of steering switches 161 and 162 (refer to FIG. 14) provided for a steering ST (refer to FIG. 14). For example, in the case where the line of sight of the driver is directed to the volume setting switch, the image indicative of the volume is displayed in the display screen region DR. When the driver operates the steering switch 161, the volume of sound output from the audio increases, and the image indicating increase in the volume is displayed in the display screen region DR. On the contrary, when the driver operates the steering switch 162, the volume of sound output from the audio decreases, and the image indicating that the volume gradually decreases is displayed in the display screen region DR.

On the other hand, in the case where the audio gaze flag F13 is not set (NO in S1120), in S1140, whether the air-conditioner gaze flag F14 is set or not is determined. In the case where the air-conditioner gaze flag F14 is set (YES in S1140), in S1150, the air-conditioner operation switch display process is executed. After completion of the air-conditioner operation switch display process, the routine advances to S1210. In the air-conditioner operation switch display process, concretely, first, on the basis of the detection result in S820, a switch to which the line of sight of the driver is directed in the air-conditioner operation switch group 133 is specified. In the air-conditioner operation switch display process, setting state information indicative of the present state set by the operation of the specified switch is obtained from the air-conditioner ECU 104 via the in-vehicle LAN 102, and the HUD device 7 is made display the obtained information until preset image display time (for example, three seconds) elapses since the time point when the line of sight of the driver is directed to the display screen region DR.

For example, in the case where the line of sight is directed to the on/off switch, in the air-conditioner operation switch display process, the on/off information indicating whether the air conditioner is operating or stops is obtained from the air-conditioner ECU 104, and the HUD device 7 is made display an image indicating the obtained on/off information.

In the case where the setting state information of the switch specified in the air-conditioner operation switch display process is displayed by the HUD device 7, the air-conditioner ECU 104 changes the setting state of the specified switch on the basis of operations of the steering switches 161 and 162 provided for the steering ST. For example, in the case where the line of sight of the driver is directed to the on/off switch, an image indicating the on/off information is displayed in the display screen region DR. When the driver operates the steering switch 161, the operation/non-operation of the air conditioner is switched, and an image indicating whether the air conditioner is operating or stops is displayed in the display screen region DR.

On the other hand, in the case where the air-conditioner gaze flag F14 is not set (NO in S1140), in S1160, whether the right-side gaze flag F15 is set or not is determined. In the case where the right-side gaze flag F15 is set (YES in S1160), in S1170, the right-side mirror display process is executed and, after completion of the right-side mirror display process, the routine moves to S1210. In the right-side mirror display process, concretely, first, image data captured by the right-side camera 111 and stored in the image capture board 114 is obtained from the image capture board 114. In the right-side mirror display process, the HUD device 7 is made display the image data obtained from the image capture board 114 until preset image display time (for example, three seconds) lapses since the time point when the line of sight of the driver is directed to the display screen region DR.

On the other hand, in the case where the right-side gaze flag F15 is not set (NO in S1160), in S1180, whether the left-side gaze flag F16 is set or not is determined. In the case where the left-side gaze flag F16 is set (YES in S1180), in S1190, the left-side mirror display process is executed and, after completion of the left-side mirror display process, the routine moves to S1210. In the left-side mirror display process, concretely, first, image data captured by the left-side camera 112 and stored in the image capture board 115 is obtained from the image capture board 115. In the left-side mirror display process, the HUD device 7 is made display the image data obtained from the image capture board 115 until preset image display time (for example, three seconds) lapses since the time point when the line of sight of the driver is directed to the display screen region DR.

On the other hand, in the case where the left-side gaze flag F16 is not set (NO in S1180), in S1200, a rear-view-mirror display process is executed and, after completion of the rear-view-mirror display process, the routine moves to S1210. In the rear-view-mirror display process, concretely, first, image data captured by the rear camera 113 and stored in the image capture board 116 is obtained from the image capture board 116. In the rear-view-mirror display process, the HUD device 7 is made display the image data obtained from the image capture board 116 until preset image display time (for example, three seconds) lapses since the time point when the line of sight of the driver is directed to the display screen region DR.

When the routine moves to S1210, the display instruction flag F1 is cleared. Further, in S1220, all of the gaze flags F11, F12, F13, F14, F15, F16, and F17 are cleared, and the display process is finished once.

In the driving assistance device 101 constructed as described above, first, the face of the driver of the vehicle is successively imaged to obtain face image data (S810). After that, using the obtained face image data, the direction of the line of sight of the driver is detected (S820) and, on the basis of the detected line-of-sight direction, which one of the display screen 131 of the navigation device, the meter unit 140, the audio operation switch group 132, the air-conditioner operation switch group 133, the side mirror 151 on the right side of the vehicle, the side mirror 152 on the left side of the vehicle, and the rear-view mirror 153 at which the driver gazes is determined (S860, S890, S920, S950, S980, S1010, and S1040).

On the basis of the detection result of the line-of-sight direction, whether the driver performs the movement of directing the line of sight to the display screen region DR or not is determined (S830). In the case where it is determined that the driver performs the movement of directing the line of sight to the display screen region DR (YES in S830), the HUD device 7 having the display screen region DR disposed in a position which can be visually recognized by the driver is made display the display information of a content which is present in accordance with the region at which the driver gazes (S840, S1070, S1090, S1110, S1130, S1150, S1170, S1190, and S1200).

In the driving assistance device 101 constructed as described above, when the driver performs the movement of directing the line of sight to the display screen region DR, the display information of the preset content is displayed in the display screen region DR disposed in the position the driver can visually recognize in accordance with the gaze region gazed by the driver. That is, to display the display information of the preset content into the display screen region DR in accordance with the gaze region gazed by the driver, the driver has to gaze a certain region in the vehicle and, after the gaze, has to perform the movement of directing the line of sight to the display screen region DR. Consequently, in the case where the driver simply gazes at a certain region, the gaze region is not displayed in the display screen region DR. Display of display information of a content according to a gaze region can be properly performed when the driver desires it.

In the case where the display screen 131 of the navigation device is included in the gaze region (YES in S1080), the HUD device 7 is made display an image displayed in the display screen 131 of the navigation device (S1090). Consequently, in the case where the driver simply gazes at the display screen 131, the image displayed in the display screen 131 is not displayed in the display screen region DR. When the driver desires to display the image displayed in the display screen 131 to the display screen region DR, it is properly done.

In the case where vehicle state information (for example, vehicle speed) displayed by the meter unit 140 is included in the gaze region (YES in S1100), the HUD device 7 is made display the vehicle state information included in the gaze region (S1100). Consequently, in the case where the driver simply gazes at the meter unit 140, the vehicle state information displayed in the meter unit 140 is not displayed in the display screen region DR. When the driver desires to display the vehicle state information displayed by the meter unit 140 to the display screen region DR, it is properly done.

The audio operation switch group 132 and the air-conditioner operation switch group 133 which are operated to change the operation states of the in-vehicle audio system and the car air conditioner mounted in the vehicle are disposed in the instrument panel 130 which can be visually recognized by the driver. In the case where a switch in the audio operation switch group 132 and the air-conditioner operation switch group 133 are included in the gaze region (YES in S1120 and YES in S1140), the HUD device 7 is made display information indicating a present operation state which can be changed by a switch included in the gaze region (S1130 and S1150). Consequently, in the case where the driver simply gazes the audio operation switch group 132 or the air-conditioner operation switch group 133, information indicating an operation state which can be changed by the switch in the audio operation switch group 132 or the air-conditioner operation switch group 133 is not displayed in the display screen region DR. When the driver desires to display information indicating the present operation state which can be changed by the switch in the switch groups 132 and 133 to the display screen region DR, it can be properly done.

The cameras 111, 112, and 113 successively capture images of the scenery reflected in the mirrors 151, 152, and 153 for checking the rear side of the vehicle to obtain a scenery image on the rear side of the vehicle. In the case where the mirror 151, 152, or 153 is included in the gaze region (YES in S1160, YES in S1180, or NO in S1180), the HUD device 7 is made display the scenery image captured by the camera 111, 112, or 113 (S1170, S1190, or S1200). Consequently, in the case where the driver simply gazes at the mirror 151, 152, or 153, the scenery image captured by the camera 111, 112, or 113 is not displayed in the display screen region DR. When the driver desires to display the scenery image captured by the camera 111, 112, or 113 to the display screen region DR, it can be properly done.

In the above-described embodiment, the process of S810 corresponds to face image capturing device and face image capturing procedure, the process of S820 corresponds to line-of-sight direction detecting device and line-of-sight direction detecting procedure, the processes of S860, S890, S920, S950, S980, S1010, and S1040 correspond to gaze region setting device and gaze region setting procedure, the process of S830 corresponds to line-of sight movement determining device and line-of sight movement determining process, and the processes in S840, S1070, S1090, S1110, S1130, S1150, S1170, S1190, and S1200 correspond to display start device and display start procedure.

The display screen 131 corresponds to a display screen in a vehicle, the meter unit 140 corresponds to vehicle state display device, the audio operation switch group 132 and the air-conditioner operation switch group 133 correspond to operation units, the mirrors 151, 152, and 153 correspond to in-vehicle mirrors, and the cameras 111, 112, and 113 correspond to rear-scenery image capturing device.

Seventh Embodiment

Hereinafter, a seventh embodiment will be described with reference to the drawings. In the seventh embodiment, only parts different from the sixth embodiment will be described.

The driving assistance device 101 of the seventh embodiment is the same as that of the sixth embodiment except for the point that the display process is changed.

Figure 17A:
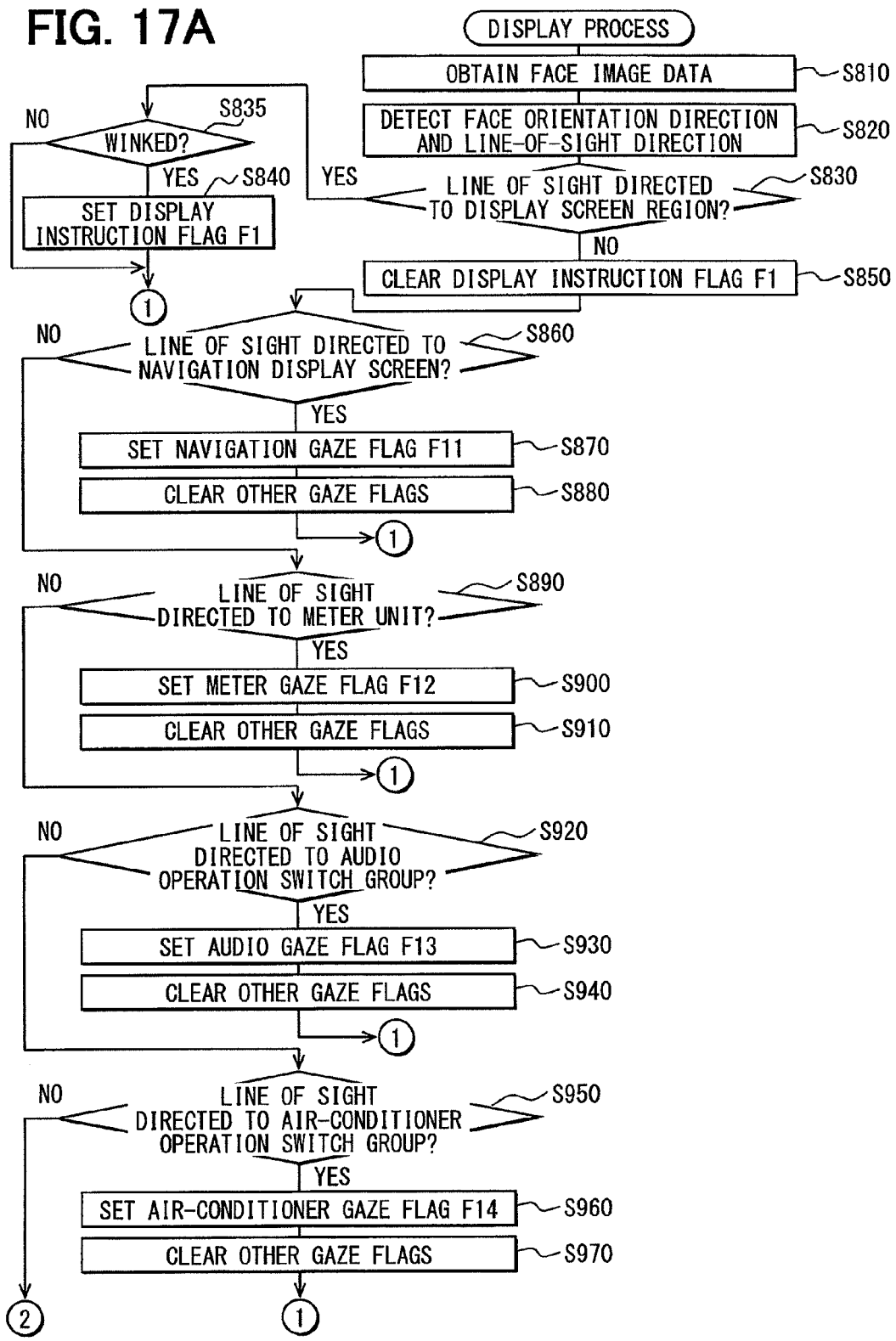
FIG. 17A is a flowchart illustrating the first half of display process of a seventh embodiment.
Figure 17B:
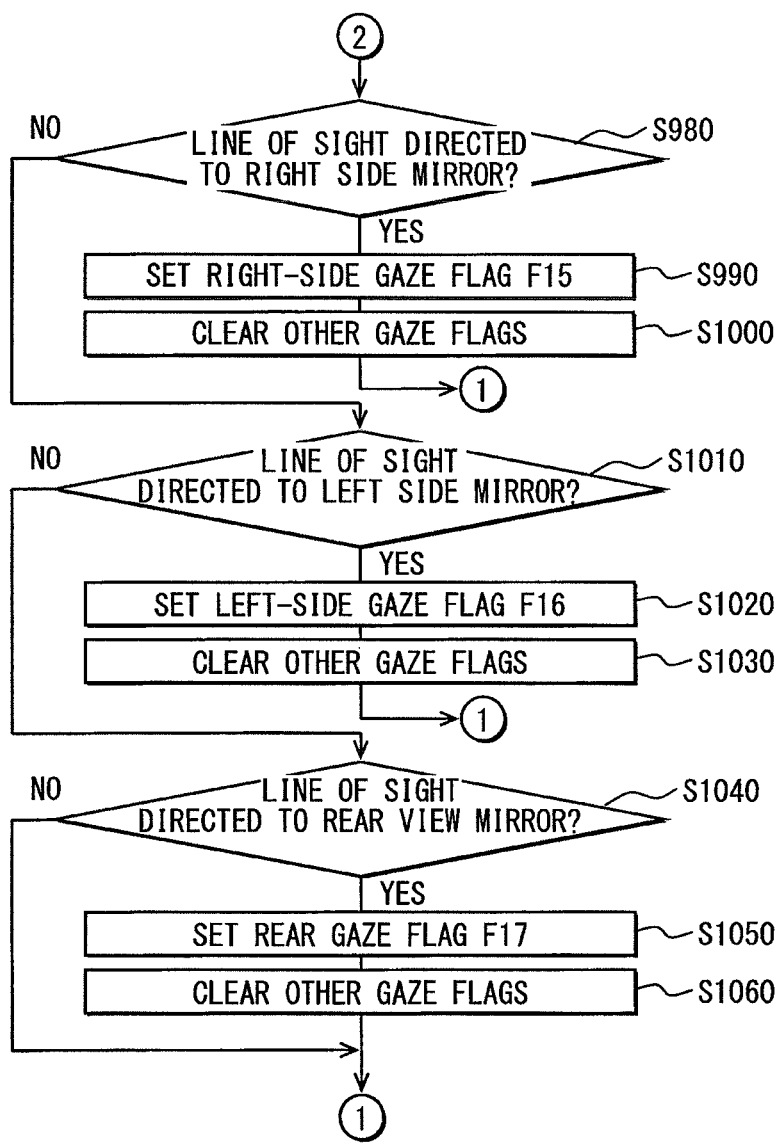
FIG. 17B is a flowchart illustrating the first half of the display process of the seventh embodiment.

The display process of the seventh embodiment is similar to that of the sixth embodiment except for the point that, as shown in FIGS. 17A and 17B, the process in S835 is added.

In the case where the line of sight of the driver is directed to the display screen region DR in S830 (YES in S830), in S835, whether the driver winks or not is determined on the basis of the shape of the eye extracted in the process of S820.

In the case where the driver winks (YES in S835), the routine moves to S840. On the other hand, in the case where the driver does not wink (NO in S835), the routine moves to S1070.

In the driving assistance device 101 constructed as described above, using the obtained face image data, whether the driver winked or not is determined (S835). In the case where it is determined that the driver performs the movement of directing his/her line of sight to the display screen region DR (YES in S830) and that the driver winked (YES in S835), the driving assistance device 101 makes the HUD device 7 start displaying the display information.

In the driving assistance device 101 constructed as described above, to display the gaze region GR in the display screen region DR, the driver has to gaze a certain region in front of the vehicle and, after the gaze, has to wink in addition to the movement of directing the line of sight to the display screen region DR. That is, in the case where the driver performs the movement of directing the line of sight to the display screen region DR after a gaze although the driver does not desire to display the gaze region GR, since the driver does not wink, the driving assistance device 101 does not display the display information. Consequently, whether the driving assistance device 101 can determine whether the driver desires to display the gaze region GR or not more properly.

In the above-described embodiment, the process of S835 corresponds to wink determining device.

For example, in the foregoing embodiment, an image is displayed in the windshield by using the HUD device 7. For example, it is also possible to mount a device having a displace screen like a liquid crystal display device in front of the driver in a vehicle and display the gaze region image in the display screen.

Although the moving object is displayed in the center of the display screen region in the second embodiment and the salient region is displayed in the center of the display screen region in the third embodiment, by performing highlight display by surrounding the moving object or the salient region displayed in the display screen region DR by a square or the like, recognition of the existence of the moving object or the salient region may be facilitated.

In the fifth embodiment, when the driver gazes, the gaze region image data is stored. When the driver performs the movement of directing the line of sight toward the display screen region DR like in the first embodiment, only the gaze region image data when the part of the gaze region GR in the periphery gazed by the driver in the scenery in front of the vehicle is displayed in the display screen region DR disposed in a position which can be visually recognized by the driver may be stored. It is also possible to store gaze region image data when the driver presses an acquisition button while casting a gaze.

In the fifth embodiment, whether the vehicle is stopped or not is determined on the basis of a detection result of the vehicle sensor 9. For example, it is also possible to determine that the vehicle is stopped when the shift position is "parking (P)" or the side brake is applied.

In the sixth embodiment, the HUD device 7 is made display an image displayed in the display screen 131 of the navigation device. In the case where a smartphone is disposed in a vehicle, it is also possible to make the HUD device 7 display an image displayed in the display screen of the smartphone when the driver gazes at the display screen of the smartphone. In this case, for example, it is possible to construct so that radio communication can be performed between the navigation device and the smartphone and the driving assistance device 101 obtains image data expressing the image displayed in the display screen of the smartphone from the navigation ECU 103 via the in-vehicle LAN 102.

Although the cameras 111 and 112 are mounted in the side mirrors 151 and 152, respectively, in the sixth embodiment, the cameras 111 and 112 may be mounted in a rear part of the vehicle.

Although the rear camera 113 is mounted in the rear bumper in the sixth embodiment, the rear camera 113 may be mounted near the rear-view mirror 153.

Although the HUD device 7 is made display the images captured by the cameras 111, 112, and 113 in the sixth embodiment, by processing images captured by the right-side camera 111, the left-side camera 112, and the rear camera 113, an image in the side mirror 151 on the right side, an image in the side mirror 152 on the left side, or an image in the rear-view mirror 153 seen from the viewpoint of the driver sitting in the driver's seat may be displayed in the display screen region DR.

Although an image is displayed by using the HUD device 7 in the sixth embodiment, the present invention is not limited to the embodiment and may be applied to a device capable of displaying an image in front of the driver (for example, a liquid crystal display).

Although image data captured by the cameras 111, 112, and 113 is stored in the image capture boards 114, 115, and 116, respectively in the sixth embodiment, image data obtained by the cameras 111, 112, and 113 may be is stored in a single image capture board.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A driving assistance device comprising:
   a face image capturing device that successively images a face of a driver of a vehicle to capture a face image;
   a face image fitting device that performs a fitting operation on the face image captured by the face image capturing device using a face shape model to transform the face image into a fitted face image;
   a line-of-sight direction detecting device that detects a line-of-sight direction of the driver by using the fitted face image;
   a gaze region setting device that sets a gaze region, at which the driver gazes, based on the line-of-sight direction detected by the line-of-sight direction detecting device;
   a display device having a display screen disposed in a position, at which the driver visually recognizes the display screen;
   a line-of-sight movement determining device that determines whether a movement of moving the line of sight of the driver matches up with a display start instruction movement, which is preliminary set to instruct a start of a display by the display device, based on a detection result by the line-of-sight direction detecting device;
   a display start device that controls the display device to start displaying display information of a content, which is preliminary set in accordance with the gaze region set by the gaze region setting device, in a case where the line-of-sight movement determining device determines that the movement of moving the line of sight of the driver matches up with the display start instruction movement match;
   a scenery image capturing device that successively images scenery in front of the vehicle to capture a scenery image, wherein the display device displays an image, in a predetermined display region, on the display screen, the image included in the scenery image obtained by the scenery image capturing device, and wherein the display start device sets the gaze region, which is set by the gaze region setting device, as the display region, and further, sets the image in the display region as the display information, the image included in the scenery image obtained by the scenery image capturing device;
   an image storing device that extracts an image in the gaze region set by the gaze region setting device, the image included in the scenery image obtained by the scenery image capturing device, and stores extracted images in a chronological order;
   a stored-image display device that displays an image stored in the image storing device;
   a face orientation direction detecting device that detects a face orientation direction of the driver by using the fitted face image; and
   a display instruction device that instructs an image displayed by the storage image display device based on the face orientation direction detected by the face orientation direction detecting device.

2. The driving assistance device according to claim 1, further comprising:
   a wink determining device that determines whether the driver winks using the fitted face image,
   wherein the display device performs one of moving-image display and still-image display of the image in the display region based on a determination result of the wink determining device.

3. The driving assistance device according to claim 1, further comprising:
   a moving object determining device that determines with using the scenery image obtained by the scenery image capturing device whether a moving object exists in the gaze region set by the gaze region setting device,
   wherein the display device displays the image in the display region as a moving image in a case where the moving object determining device determines that the moving object exists in the gaze region.

4. The driving assistance device according to claim 3, further comprising:
   a first display region setting device that sets the display region so that the moving object is positioned in the center of the display screen in a case where the moving object determining device determines that the moving object exists in the gaze region.

5. The driving assistance device according to claim 1, further comprising:
   a salient region determining device that determines with using the scenery image obtained by the scenery image capturing device whether a salient region exists in the gaze region set by the gaze region setting device; and
   a second display region setting device that sets the display region so that the salient region is positioned in the center of the display screen in a case where the salient region determining device determines that the salient region exists in the gaze region.

6. The driving assistance device according to claim 1, further comprising:
   a gaze determining device that determines based on the line-of-sight direction detected by the line-of-sight direction detecting device whether the driver gazes at a peripheral part of the display screen; and
   a third display region setting device that sets the display region so that a point gazed by the driver in the peripheral part of the display screen is positioned in the center of the display screen in a case where the gaze determining device determines that the driver gazes at the peripheral part of the display screen.

7. The driving assistance device according to claim 1, wherein:
   the face shape model expresses a shape of a face of a human being using a basic shape and a plurality of shape vectors,
   the basic shape expresses a front face defined by a plurality of triangular meshes, and
   the plurality of shape vectors each express a face orientation direction varying from the basic shape.

* * * * *